(12) United States Patent
Derelöv

(10) Patent No.: US 11,614,114 B2
(45) Date of Patent: Mar. 28, 2023

(54) PANELS FOR AN ASSEMBLED PRODUCT

(71) Applicant: Valinge Innovation AB, Viken (SE)

(72) Inventor: Peter Derelöv, Helsingborg (SE)

(73) Assignee: VALINGE INNOVATION AB, Viken (SE)

( * ) Notice: Subject to any disclaimer, the term of this patent is extended or adjusted under 35 U.S.C. 154(b) by 1185 days.

(21) Appl. No.: 15/956,949

(22) Filed: Apr. 19, 2018

(65) Prior Publication Data

US 2019/0323535 A1 Oct. 24, 2019

(51) Int. Cl.
| | | |
|---|---|---|
| *F16B 12/46* | (2006.01) | |
| *A47B 47/00* | (2006.01) | |
| *F16B 12/20* | (2006.01) | |
| *A47B 96/04* | (2006.01) | |
| *A47B 61/00* | (2006.01) | |
| *A47B 88/90* | (2017.01) | |

(52) U.S. Cl.
CPC .......... *F16B 12/46* (2013.01); *A47B 47/0075* (2013.01); *F16B 12/20* (2013.01); *A47B 61/003* (2013.01); *A47B 88/941* (2017.01); *A47B 96/04* (2013.01)

(58) Field of Classification Search
CPC .... F16B 2012/466; F16B 12/20; F16B 12/26; F16B 12/46; A47B 2230/0081; A47B 2230/0096; A47B 47/0075; A47B 47/042; A47B 61/003; A47B 88/941; A47B 96/04; A47B 96/201
See application file for complete search history.

(56) References Cited

U.S. PATENT DOCUMENTS

| | | | |
|---|---|---|---|
| 291,032 A | 1/1884 | Cleland | |
| 634,581 A | 10/1899 | Miller | |
| 701,000 A | 5/1902 | Ahrens | |
| 861,911 A | 7/1907 | Stewart | |
| 881,673 A | 3/1908 | Ellison | |

(Continued)

FOREIGN PATENT DOCUMENTS

| | | | |
|---|---|---|---|
| AT | 400 611 B | 2/1996 | |
| CH | 365 507 A | 11/1962 | |

(Continued)

OTHER PUBLICATIONS

U.S. Appl. No. 17/119,392, Bruno et al.

(Continued)

*Primary Examiner* — Matthew R McMahon
(74) *Attorney, Agent, or Firm* — Buchanan Ingersoll & Rooney P.C.

(57) ABSTRACT

In a set of panels for an assembled product, a first panel and a second panel may be assembled with a third panel. An end surface of the third panel includes a first tongue and a second tongue. The first panel and the second panel are configured to be arranged with their respective end surfaces facing each other. A first tongue of the third panel is configured to be arranged in an edge groove of the first panel and a second tongue of the third panel is configured to be received in an edge groove of the second panel to join the panels at least in a first direction. The first panel and the second panel may be of a first panel type, and the third panel may be of a second panel type. A corner element may be connected to a side panel of an assembled product.

23 Claims, 13 Drawing Sheets

(56) References Cited

U.S. PATENT DOCUMENTS

| | | |
|---|---|---|
| 1,533,099 A | 4/1925 | Carroll |
| 1,534,468 A | 4/1925 | Shea, Jr. |
| 1,800,386 A | 4/1931 | Hoffman |
| 1,800,387 A | 4/1931 | Greist |
| 1,802,245 A | 4/1931 | Foretich |
| 1,954,242 A | 4/1934 | Heppenstall |
| 2,360,451 A | 10/1944 | Stone |
| 2,362,904 A | 11/1944 | Kramer |
| 2,496,184 A | 1/1950 | Von Canon |
| 2,681,483 A | 6/1954 | Morawetz |
| 3,002,630 A | 10/1961 | Heisser |
| 3,195,968 A | 7/1965 | Freeman |
| 3,284,152 A | 11/1966 | Schörghuber |
| 3,313,054 A | 4/1967 | Madey |
| 3,347,610 A | 10/1967 | Pilliod |
| 3,410,441 A | 11/1968 | Rhyne |
| 3,722,704 A | 3/1973 | Piretti |
| 3,722,971 A | 3/1973 | Zeischegg |
| 3,742,807 A | 7/1973 | Manning |
| 3,765,465 A | 10/1973 | Gulistan |
| 3,784,271 A | 1/1974 | Schreiber |
| 3,836,217 A * | 9/1974 | Shiina ............... A47B 47/0041 312/107 |
| 3,874,753 A * | 4/1975 | Naito ............... A47B 47/0041 312/111 |
| 3,884,002 A | 5/1975 | Logie |
| 3,885,845 A | 5/1975 | Krieks |
| 3,981,118 A | 9/1976 | Johnson et al. |
| 4,089,614 A | 5/1978 | Harley |
| 4,099,293 A | 7/1978 | Pittasch |
| 4,099,887 A | 7/1978 | Mackenroth |
| 4,116,510 A | 9/1978 | Franco |
| 4,142,271 A | 3/1979 | Busse |
| 4,211,379 A | 7/1980 | Morgan et al. |
| 4,222,544 A | 9/1980 | Crowder |
| 4,279,397 A | 7/1981 | Larsson |
| 4,299,067 A | 11/1981 | Bertschi |
| 4,308,961 A | 1/1982 | Kunce |
| 4,324,517 A | 4/1982 | Dey |
| 4,403,886 A | 9/1983 | Haeusler |
| 4,405,253 A | 9/1983 | Stockum |
| 4,509,648 A | 4/1985 | Govang |
| 4,593,734 A | 6/1986 | Wallace |
| 4,595,105 A | 6/1986 | Gold |
| 4,597,122 A | 7/1986 | Handler |
| 4,615,448 A | 10/1986 | Johnstonbaugh |
| 4,629,076 A | 12/1986 | Amstutz et al. |
| 4,750,794 A | 6/1988 | Vegh |
| 4,752,150 A | 6/1988 | Salice |
| 4,815,908 A | 3/1989 | Duran et al. |
| 4,817,900 A | 4/1989 | Whittington et al. |
| 4,844,266 A | 7/1989 | Small et al. |
| 4,883,331 A | 11/1989 | Mengel |
| 4,886,326 A | 12/1989 | Kuzyk |
| 4,888,933 A | 12/1989 | Guomundsson |
| 4,891,897 A | 1/1990 | Gieske et al. |
| 4,909,581 A | 3/1990 | Haheeb |
| 4,938,625 A | 7/1990 | Matsui |
| 4,944,416 A | 7/1990 | Petersen et al. |
| 4,961,295 A | 10/1990 | Kosch, Sr. et al. |
| 5,004,116 A | 4/1991 | Cattarozzi |
| 5,018,323 A | 5/1991 | Clausen |
| 5,109,993 A | 5/1992 | Hutchison |
| 5,114,265 A | 5/1992 | Grisley |
| 5,121,578 A | 6/1992 | Holz |
| 5,125,518 A | 6/1992 | Ward |
| 5,138,803 A | 8/1992 | Grossen |
| 5,209,556 A | 5/1993 | Anderson |
| 5,212,925 A | 5/1993 | McClinton |
| 5,299,509 A | 4/1994 | Ballard |
| 5,360,121 A | 11/1994 | Sothman |
| 5,375,802 A | 12/1994 | Branham, II |
| 5,423,155 A | 6/1995 | Bauer |
| 5,451,102 A | 9/1995 | Chuan |
| 5,458,433 A | 10/1995 | Stastny |
| 5,471,804 A | 12/1995 | Winter, IV |
| 5,475,960 A | 12/1995 | Lindal |
| 5,499,667 A | 3/1996 | Nakanishi |
| 5,499,886 A | 3/1996 | Short et al. |
| 5,507,331 A | 4/1996 | Nakanishi |
| 5,527,103 A | 6/1996 | Pittman |
| 5,536,108 A | 7/1996 | Kvalheim |
| 5,658,086 A | 8/1997 | Brokaw et al. |
| 5,711,115 A | 1/1998 | Wirt |
| 5,775,521 A | 7/1998 | Tisbo |
| 5,810,505 A | 9/1998 | Henriott |
| 5,893,617 A | 4/1999 | Lee |
| 5,941,026 A | 8/1999 | Eisenreich |
| 5,944,294 A | 8/1999 | Baer |
| 5,950,389 A | 9/1999 | Porter |
| 6,045,290 A | 4/2000 | Nocievski |
| 6,050,426 A | 4/2000 | Leurdijk |
| 6,142,436 A | 11/2000 | Thurston et al. |
| 6,312,186 B1 | 11/2001 | Röck et al. |
| 6,349,507 B1 | 2/2002 | Muellerleile |
| 6,363,645 B1 | 4/2002 | Hunter |
| 6,413,007 B1 | 7/2002 | Lambright |
| 6,418,683 B1 | 7/2002 | Martensson |
| 6,491,172 B2 | 12/2002 | Chance |
| 6,505,452 B1 | 1/2003 | Hannig |
| 6,547,086 B1 | 4/2003 | Harvey |
| 6,578,498 B1 | 6/2003 | Draudt et al. |
| 6,675,979 B2 | 1/2004 | Taylor |
| D486,676 S | 2/2004 | Campbell et al. |
| 6,769,219 B2 | 8/2004 | Schwitte et al. |
| 6,772,890 B2 | 8/2004 | Campbell et al. |
| 6,827,028 B1 | 12/2004 | Callaway |
| 6,971,614 B2 | 12/2005 | Fischer et al. |
| 7,127,860 B2 | 10/2006 | Pervan |
| 7,223,045 B2 | 5/2007 | Migli |
| 7,228,977 B2 | 6/2007 | Perkins et al. |
| 7,300,120 B2 | 11/2007 | Shin |
| 7,451,535 B2 | 11/2008 | Wells et al. |
| 7,451,578 B2 | 11/2008 | Hannig |
| 7,584,583 B2 | 9/2009 | Bergelin et al. |
| 7,614,350 B2 | 11/2009 | Tuttle et al. |
| 7,621,092 B2 | 11/2009 | Groeke et al. |
| 7,641,414 B1 | 1/2010 | Joyce |
| 7,717,278 B2 | 5/2010 | Kao |
| 7,721,503 B2 | 5/2010 | Pervan et al. |
| 7,793,450 B2 | 9/2010 | Chasmer et al. |
| 7,818,939 B2 | 10/2010 | Bearinger |
| 7,998,549 B2 | 8/2011 | Susnjara |
| 8,033,074 B2 | 10/2011 | Pervan |
| 8,038,363 B2 | 10/2011 | Hannig |
| 8,042,311 B2 | 10/2011 | Pervan |
| 8,146,754 B2 | 4/2012 | Apgood |
| 8,220,217 B2 | 7/2012 | Muehlebach |
| 8,234,830 B2 | 8/2012 | Pervan |
| 8,365,499 B2 | 2/2013 | Nilsson et al. |
| 8,387,327 B2 | 3/2013 | Pervan |
| 8,464,408 B2 | 6/2013 | Hazzard |
| 8,495,849 B2 | 7/2013 | Pervan |
| 8,505,257 B2 | 8/2013 | Boo et al. |
| 8,544,230 B2 | 10/2013 | Pervan |
| 8,596,013 B2 | 12/2013 | Boo |
| 8,602,227 B1 | 12/2013 | McDonald |
| 8,615,952 B2 | 12/2013 | Engström |
| 8,713,886 B2 | 5/2014 | Pervan |
| 8,745,952 B2 | 6/2014 | Perra |
| 8,764,137 B2 | 7/2014 | Fehre |
| 8,776,473 B2 | 7/2014 | Pervan |
| 8,833,028 B2 | 9/2014 | Whispell et al. |
| 8,864,407 B1 | 10/2014 | Sorum |
| 8,882,416 B2 | 11/2014 | Baur et al. |
| 8,887,468 B2 * | 11/2014 | Hakansson ........ A47B 47/0066 52/586.1 |
| 9,175,703 B2 | 11/2015 | Maertens |
| 9,216,541 B2 | 12/2015 | Boo |
| 9,290,948 B2 | 3/2016 | Cappelle et al. |
| 9,375,085 B2 | 6/2016 | Derelöv |
| 9,538,842 B2 | 1/2017 | Håkansson et al. |
| 9,655,442 B2 | 5/2017 | Boo et al. |
| 9,700,157 B2 | 7/2017 | Keyvanloo |

(56) References Cited

U.S. PATENT DOCUMENTS

| | | |
|---|---|---|
| 9,714,672 B2 | 7/2017 | Derelöv et al. |
| 9,723,923 B2 | 8/2017 | Derelöv |
| 9,726,210 B2 | 8/2017 | Derelöv et al. |
| 9,745,756 B2 | 8/2017 | Hannig |
| 9,758,973 B2 | 9/2017 | Segaert |
| 9,763,528 B2 | 9/2017 | Lung |
| 9,809,983 B2 | 11/2017 | Trudel |
| 9,945,121 B2 | 4/2018 | Derelöv |
| 10,034,541 B2 | 7/2018 | Boo et al. |
| 10,202,996 B2 | 2/2019 | Håkansson et al. |
| 10,378,570 B2 | 8/2019 | Broughton |
| 10,415,613 B2 | 9/2019 | Boo |
| 10,448,739 B2 | 10/2019 | Derelöv et al. |
| 10,451,097 B2 | 10/2019 | Brännström et al. |
| 10,486,245 B2 | 11/2019 | Fridlund |
| 10,506,875 B2 | 12/2019 | Boo et al. |
| 10,544,818 B2 | 1/2020 | Fridlund |
| 10,548,397 B2 | 2/2020 | Derelöv et al. |
| 10,669,716 B2 | 6/2020 | Derelöv |
| 10,670,064 B2 | 6/2020 | Derelöv |
| 10,724,564 B2 | 7/2020 | Derelöv |
| 10,731,688 B2 | 8/2020 | Brännström et al. |
| 10,736,416 B2 | 8/2020 | Derelöv et al. |
| 10,830,266 B2 | 11/2020 | Fridlund |
| 10,830,268 B2 | 11/2020 | Boo |
| 10,871,179 B2 | 12/2020 | Hakansson et al. |
| 10,876,562 B2 | 12/2020 | Pervan |
| 10,876,563 B2 | 12/2020 | Derelov et al. |
| 10,968,936 B2 | 4/2021 | Boo et al. |
| 11,076,691 B2 | 8/2021 | Boo |
| 11,083,287 B2 | 8/2021 | Boo et al. |
| 11,098,484 B2 | 8/2021 | Derelöv |
| 11,137,007 B2 | 10/2021 | Fridlund |
| 11,204,051 B2 | 12/2021 | Brännström et al. |
| 11,246,415 B2 | 2/2022 | Derelöv et al. |
| 2002/0170258 A1 | 11/2002 | Schwitte et al. |
| 2004/0165946 A1 | 8/2004 | Areh et al. |
| 2005/0042027 A1 | 2/2005 | Migli |
| 2005/0236544 A1 | 10/2005 | Mancino |
| 2005/0247653 A1 | 11/2005 | Brooks |
| 2006/0091093 A1 | 5/2006 | Armari |
| 2006/0101769 A1 | 5/2006 | Pervan et al. |
| 2006/0180561 A1 | 8/2006 | Wisnoski et al. |
| 2006/0236642 A1 | 10/2006 | Pervan |
| 2006/0273085 A1 | 12/2006 | Casto |
| 2007/0006543 A1 | 1/2007 | Engström |
| 2007/0028547 A1 | 2/2007 | Grafenauer et al. |
| 2007/0193178 A1 | 8/2007 | Groeke et al. |
| 2008/0010937 A1 | 1/2008 | Pervan et al. |
| 2008/0066415 A1 | 3/2008 | Pervan |
| 2008/0193209 A1 | 8/2008 | Henderson |
| 2008/0216435 A1 | 9/2008 | Nolan |
| 2008/0236088 A1 | 10/2008 | Hannig et al. |
| 2008/0244882 A1 | 10/2008 | Woxman et al. |
| 2009/0014401 A1 | 1/2009 | Tallman |
| 2009/0064624 A1 | 3/2009 | Sokol |
| 2010/0028592 A1 | 2/2010 | Barkdoll et al. |
| 2010/0083603 A1 | 4/2010 | Goodwin |
| 2010/0104354 A1 | 4/2010 | Spalding |
| 2010/0173122 A1 | 7/2010 | Susnjara |
| 2010/0289389 A1 | 11/2010 | Crabtree, II |
| 2011/0023303 A1 | 2/2011 | Pervan et al. |
| 2011/0225921 A1 | 9/2011 | Schulte |
| 2011/0225922 A1 | 9/2011 | Pervan et al. |
| 2011/0280655 A1 | 11/2011 | Maertens et al. |
| 2011/0283650 A1 | 11/2011 | Pervan et al. |
| 2012/0009383 A1 | 1/2012 | Hardesty |
| 2012/0027967 A1 | 2/2012 | Maertens et al. |
| 2012/0073235 A1 | 3/2012 | Hannig |
| 2012/0124932 A1 | 5/2012 | Schulte et al. |
| 2012/0145845 A1 | 6/2012 | Hightower |
| 2012/0180416 A1 | 7/2012 | Perra et al. |
| 2012/0279161 A1 | 11/2012 | Håkansson et al. |
| 2012/0286637 A1 | 11/2012 | Fehre |
| 2013/0014463 A1 | 1/2013 | Pervan |
| 2013/0048632 A1 | 2/2013 | Chen |
| 2013/0071172 A1 | 3/2013 | Maertens et al. |
| 2013/0081349 A1 | 4/2013 | Pervan |
| 2013/0097846 A1 | 4/2013 | Pettigrew |
| 2013/0111845 A1 | 5/2013 | Pervan |
| 2013/0170904 A1 | 7/2013 | Cappelle et al. |
| 2013/0232905 A2 | 9/2013 | Pervan |
| 2013/0287484 A1 | 10/2013 | Phillips |
| 2014/0013919 A1 | 1/2014 | Gerke et al. |
| 2014/0055018 A1 | 2/2014 | Shein et al. |
| 2014/0111076 A1 | 4/2014 | Devos |
| 2014/0286701 A1 | 9/2014 | Sauer |
| 2014/0294498 A1 | 10/2014 | Logan |
| 2015/0034522 A1 | 2/2015 | Itou et al. |
| 2015/0035422 A1 | 2/2015 | Håkansson et al. |
| 2015/0078807 A1 | 3/2015 | Brännström et al. |
| 2015/0078819 A1 | 3/2015 | Derelöv et al. |
| 2015/0196118 A1 | 7/2015 | Derelöv |
| 2015/0198191 A1 | 7/2015 | Boo |
| 2015/0230600 A1 | 8/2015 | Schulte |
| 2015/0330088 A1 | 11/2015 | Derelöv |
| 2015/0368896 A1 | 12/2015 | Schulte |
| 2016/0000220 A1 | 1/2016 | Devos |
| 2016/0007751 A1 | 1/2016 | Derelöv |
| 2016/0145029 A1 | 5/2016 | Ranade et al. |
| 2016/0174704 A1 | 6/2016 | Boo et al. |
| 2016/0186925 A1 | 6/2016 | Bettin |
| 2016/0192775 A1 | 7/2016 | Andersson |
| 2016/0270531 A1 | 9/2016 | Derelöv |
| 2017/0079433 A1 | 3/2017 | Derelöv et al. |
| 2017/0089379 A1 | 3/2017 | Pervan |
| 2017/0097033 A1 | 4/2017 | Håkansson et al. |
| 2017/0159291 A1 | 6/2017 | Derelöv |
| 2017/0208938 A1 | 7/2017 | Derelöv et al. |
| 2017/0227031 A1 | 8/2017 | Boo |
| 2017/0227032 A1 | 8/2017 | Fridlund |
| 2017/0227035 A1 | 8/2017 | Fridlund |
| 2017/0234346 A1 | 8/2017 | Fridlund |
| 2017/0298973 A1 | 10/2017 | Derelöv |
| 2017/0360193 A1 | 12/2017 | Boo et al. |
| 2018/0080488 A1 | 3/2018 | Derelöv |
| 2018/0087552 A1 | 3/2018 | Derelöv et al. |
| 2018/0112695 A1 | 4/2018 | Boo et al. |
| 2018/0119717 A1 | 5/2018 | Derelöv |
| 2018/0202160 A1 | 7/2018 | Derelöv |
| 2018/0283430 A1 | 10/2018 | Leistert |
| 2018/0328396 A1 | 11/2018 | Fransson et al. |
| 2019/0113061 A1 | 4/2019 | Håkansson et al. |
| 2019/0166989 A1 | 6/2019 | Boo et al. |
| 2019/0191870 A1 | 6/2019 | Derelöv |
| 2019/0195256 A1 | 6/2019 | Derelöv |
| 2019/0289999 A1 | 9/2019 | Derelöv et al. |
| 2019/0320793 A1 | 10/2019 | Boo |
| 2019/0323532 A1 | 10/2019 | Boo |
| 2019/0323533 A1 | 10/2019 | Boo |
| 2019/0323534 A1 | 10/2019 | Derelöv |
| 2020/0003242 A1 | 1/2020 | Brännström et al. |
| 2020/0055126 A1 | 2/2020 | Fridlund |
| 2020/0069048 A1 | 3/2020 | Derelöv et al. |
| 2020/0069049 A1 | 3/2020 | Derelöv et al. |
| 2020/0102978 A1 | 4/2020 | Fridlund |
| 2020/0121076 A1 | 4/2020 | Derelöv et al. |
| 2020/0214447 A1 | 7/2020 | Derelöv et al. |
| 2020/0300284 A1 | 9/2020 | Pervan |
| 2020/0337455 A1 | 10/2020 | Boo et al. |
| 2020/0340513 A1 | 10/2020 | Derelöv |
| 2021/0079650 A1 | 3/2021 | Derelöv |
| 2021/0148392 A1 | 5/2021 | Brännström et al. |
| 2021/0180630 A1 | 6/2021 | Bruno et al. |
| 2021/0190112 A1 | 6/2021 | Derelöv |
| 2021/0207635 A1 | 7/2021 | Håkansson et al. |
| 2021/0222716 A1 | 7/2021 | Derelöv et al. |
| 2021/0262507 A1 | 8/2021 | Svensson et al. |
| 2021/0262508 A1 | 8/2021 | Svensson et al. |
| 2021/0276108 A1 | 9/2021 | Derelöv et al. |
| 2021/0285480 A1 | 9/2021 | Derelöv et al. |

(56) References Cited

U.S. PATENT DOCUMENTS

| | | |
|---|---|---|
| 2021/0381251 A1 | 12/2021 | Svensson |
| 2022/0018373 A1 | 1/2022 | Boo |

FOREIGN PATENT DOCUMENTS

| | | | |
|---|---|---|---|
| CH | 685 276 A5 | 5/1995 | |
| CH | 696 889 A5 | 1/2008 | |
| CH | 698 988 B1 | 12/2009 | |
| CH | 705 082 A2 | 12/2012 | |
| CN | 101099618 A | 1/2008 | |
| CN | 101099618 A * | 1/2008 | |
| CN | 102 917 616 A | 2/2013 | |
| CN | 203424576 U | 2/2014 | |
| DE | 1107910 B | 5/1961 | |
| DE | 24 14 104 A1 | 10/1975 | |
| DE | 25 14 357 A1 | 10/1975 | |
| DE | 26 35 237 A | 2/1978 | |
| DE | 31 03 281 A1 | 8/1982 | |
| DE | DD 228 872 A1 | 10/1985 | |
| DE | 42 29 115 A1 | 3/1993 | |
| DE | 94 17 168 U1 | 2/1995 | |
| DE | 198 31 936 A1 | 2/1999 | |
| DE | 298 20 031 U1 | 2/1999 | |
| DE | 198 05 538 A1 | 8/1999 | |
| DE | 203 04 761 U1 | 4/2004 | |
| DE | 299 24 630 U1 | 5/2004 | |
| DE | 20 2005 019 986 U1 | 2/2006 | |
| DE | 20 2004 017 486 U1 | 4/2006 | |
| DE | 20 2008 011 589 U1 | 11/2008 | |
| DE | 20 2009 008 825 U1 | 10/2009 | |
| DE | 10 2008 035 293 A1 | 2/2010 | |
| DE | 10 2009 041 142 A1 | 3/2011 | |
| DE | 10 2011 057 018 A1 | 6/2013 | |
| DE | 10 2013 008 595 A1 | 11/2013 | |
| DE | 202014100089 U1 * | 4/2015 | ............ F16B 5/0642 |
| DE | 10 2015 103 429 A1 | 10/2015 | |
| DE | 10 2014 110 124 A1 | 1/2016 | |
| DE | 20 2017 101 856 U1 | 4/2017 | |
| EP | 0 060 203 A3 | 9/1982 | |
| EP | 0 357 129 A1 | 3/1990 | |
| EP | 0 362 968 A | 4/1990 | |
| EP | 0 675 332 A2 | 10/1995 | |
| EP | 0 871 156 A2 | 10/1998 | |
| EP | 0 935 076 A1 | 8/1999 | |
| EP | 1 048 423 A2 | 11/2000 | |
| EP | 1 048 423 B9 | 5/2005 | |
| EP | 1 650 375 A1 | 4/2006 | |
| EP | 1 671 562 A1 | 6/2006 | |
| EP | 1 650 375 A8 | 9/2006 | |
| EP | 1 863 984 A1 | 12/2007 | |
| EP | 1 922 954 A1 | 5/2008 | |
| EP | 2 017 403 A2 | 1/2009 | |
| EP | 2 037 128 A1 | 3/2009 | |
| EP | 1 922 954 B1 | 7/2009 | |
| EP | 2 333 353 A2 | 6/2011 | |
| EP | 1 863 984 B1 | 11/2011 | |
| EP | 2 487 373 A1 | 8/2012 | |
| EP | 3 031 998 A1 | 6/2016 | |
| ER | 0 060 203 A2 | 9/1982 | |
| FR | 2 062 731 A5 | 6/1971 | |
| FR | 2 517 187 A1 | 6/1983 | |
| FR | 2 597 173 A1 | 10/1987 | |
| FR | 2597173 A1 * | 10/1987 | ............ F16B 5/0052 |
| FR | 2 602 013 A1 | 1/1988 | |
| GB | 245332 | 1/1926 | |
| GB | 799155 A | 8/1958 | |
| GB | 1 022 377 A | 3/1966 | |
| GB | 2 163 825 A | 3/1986 | |
| GB | 2 315 988 A | 2/1998 | |
| GB | 2 445 954 A | 7/2008 | |
| GB | 2 482 213 A | 1/2012 | |
| GB | 2 520 927 A | 6/2015 | |
| JP | S53-113160 U | 9/1978 | |
| JP | H06-22606 U | 3/1994 | |
| JP | 2003-239921 A | 8/2003 | |
| KR | 10-1147274 B1 | 5/2012 | |
| KR | 2014-0042314 A | 4/2014 | |
| WO | WO 87/07339 A1 | 12/1987 | |
| WO | WO 90/07066 | 6/1990 | |
| WO | WO 99/22150 A1 | 5/1999 | |
| WO | WO 99/41508 A2 | 8/1999 | |
| WO | WO 00/66856 A1 | 11/2000 | |
| WO | WO 01/02669 A1 | 1/2001 | |
| WO | WO 01/02670 A1 | 1/2001 | |
| WO | WO 01/51733 A1 | 7/2001 | |
| WO | WO 01/53628 A1 | 7/2001 | |
| WO | WO 02/055809 A1 | 7/2002 | |
| WO | WO 02/055810 A1 | 7/2002 | |
| WO | WO 03/016654 A1 | 2/2003 | |
| WO | WO 03/027510 A2 | 4/2003 | |
| WO | WO 03/083234 A1 | 10/2003 | |
| WO | WO 2004/079130 A1 | 9/2004 | |
| WO | WO 2005/068747 A1 | 7/2005 | |
| WO | WO 2006/043893 A1 | 4/2006 | |
| WO | WO 2006/103500 A1 | 10/2006 | |
| WO | WO 2006/104436 A1 | 10/2006 | |
| WO | WO 2007/015669 A2 | 2/2007 | |
| WO | WO 2007/015669 A3 | 2/2007 | |
| WO | WO 2007/079845 A1 | 7/2007 | |
| WO | WO 2008/004960 A2 | 1/2008 | |
| WO | WO 2008/004960 A3 | 1/2008 | |
| WO | WO 2008/004960 A8 | 1/2008 | |
| WO | WO 2008/017281 A1 | 2/2008 | |
| WO | WO 2008/017301 A2 | 2/2008 | |
| WO | WO 2008/017301 A3 | 2/2008 | |
| WO | WO 2008/150234 A1 | 12/2008 | |
| WO | WO 2009/136195 A1 | 11/2009 | |
| WO | WO 2010/023042 A1 | 3/2010 | |
| WO | WO 2010/070472 A2 | 6/2010 | |
| WO | WO 2010/070472 A3 | 6/2010 | |
| WO | WO 2010/070605 A2 | 6/2010 | |
| WO | WO 2010/070605 A3 | 6/2010 | |
| WO | WO 2010/082171 A2 | 7/2010 | |
| WO | WO 2010/087752 A1 | 8/2010 | |
| WO | WO 2011/012104 A2 | 2/2011 | |
| WO | WO 2011/012104 A3 | 2/2011 | |
| WO | WO 2011/085710 A1 | 7/2011 | |
| WO | WO 2011/151737 A2 | 12/2011 | |
| WO | WO 2011/151737 A3 | 12/2011 | |
| WO | WO 2011/151737 A9 | 12/2011 | |
| WO | WO 2011/151758 A2 | 12/2011 | |
| WO | WO 2011/151758 A3 | 12/2011 | |
| WO | WO 2012/095454 A1 | 7/2012 | |
| WO | WO 2012/154113 A1 | 11/2012 | |
| WO | WO 2013/009257 A1 | 1/2013 | |
| WO | WO 2013/025163 A1 | 2/2013 | |
| WO | WO 2013/080160 A1 | 6/2013 | |
| WO | WO 2013/093636 A2 | 6/2013 | |
| WO | WO 2013/093636 A3 | 6/2013 | |
| WO | WO 2013/118075 A1 | 8/2013 | |
| WO | WO 2014/072080 A1 | 5/2014 | |
| WO | WO 2014/108114 A1 | 7/2014 | |
| WO | WO 2014/12141 A1 | 8/2014 | |
| WO | WO 2014/121410 A1 | 8/2014 | |
| WO | WO 2015/015603 A1 | 2/2015 | |
| WO | WO 2015/038059 A1 | 3/2015 | |
| WO | WO 2015/105449 A1 | 7/2015 | |
| WO | WO 2015/105450 A1 | 7/2015 | |
| WO | WO 2015/105451 A1 | 7/2015 | |
| WO | WO 2016/099396 A1 | 6/2016 | |
| WO | WO 2016/175701 A1 | 11/2016 | |
| WO | WO 2016/187533 A1 | 11/2016 | |
| WO | WO 2017/131574 A1 | 8/2017 | |
| WO | WO 2017/135874 | 8/2017 | |
| WO | WO 2017/138874 A1 | 8/2017 | |
| WO | WO 2018/004435 A1 | 1/2018 | |
| WO | WO 2018/080387 A1 | 5/2018 | |
| WO | WO 2019/125291 A1 | 6/2019 | |
| WO | WO 2019/125292 A1 | 6/2019 | |

(56) References Cited

OTHER PUBLICATIONS

U.S. Appl. No. 17/126,518, Derelöv et al.
Bruno, Jimmie, et al. U.S. Appl. No. 17/119,392 entitled "Mechanical Locking System for Panels," filed in the U.S. Patent and Trademark Office filed Dec. 11, 2020.
Derelöv, Peter, U.S. Appl. No. 17/126,518 entitled "Set of Panels with a Mechanical Locking Device," filed in the U.S. Patent and Trademark Office filed Dec. 18, 2020.
International Search Report/Written Opinion dated Aug. 7, 2018 in PCT/SE2018/050396, ISA/SE, Patent-och registreringsverket, Stockholm, SE, 16 pages.
U.S. Appl. No. 16/951,394, Håkansson et al.
U.S. Appl. No. 16/953,608, Derelöv et al.
Extended European Search Report issued in EP Application No. 18787493.8, dated Nov. 23, 2020, European Patent Office, Munich, DE, 11 pages.
Håkansson, Niclas, et al., U.S. Appl. No. 16/951,394 entitled "Mechanical Locking System for Building Panels," filed in the U.S. Patent and Trademark Office on Nov. 18, 2020.
Derelöv, Peter, et al., U.S. Appl. No. 16/953,608 entitled "An Assembled Product and a Method of Assembling the Product," filed in the U.S. Patent and Trademark Office on Nov. 20, 2020.
U.S. Appl. No. 16/553,325, Derelöv et al.
U.S. Appl. No. 16/553,350, Derelöv et al.
U.S. Appl. No. 16/567,436, Derelöv.
U.S. Appl. No. 16/663,603, Fridlund.
U.S. Appl. No. 16/697,335, Boo et al.
U.S. Appl. No. 16/703,077, Fridlund.
U.S. Appl. No. 16/722,096, Derelöv et al.
Derelöv, Peter, U.S. Appl. No. 16/553,325 entitled "Set of Panels with a Mechanical Locking Device," filed in the U.S. Patent and Trademark Office filed Aug. 28, 2019.
Derelöv, Peter, U.S. Appl. No. 16/553,350 entitled "Set of Panels with a Mechanical Locking Device," filed in the U.S. Patent and Trademark Office filed Aug. 28, 2019.
Derelöv, Peter, U.S. Appl. No. 16/567,436 entitled "Panels Comprising a Mechanical Locking Device and an Assembled Product Comprising the Panels," filed in the U.S. Patent and Trademark Office filed Sep. 11, 2019.
Fridlund, Magnus, U.S. Appl. No. 16/663,603 entitled "Element and Method for Providing Dismantling Groove," filed in the U.S. Patent and Trademark Office filed Oct. 25, 2019.
Boo, Christian, et al., U.S. Appl. No. 16/697,335 entitled "Panels Comprising a Mechanical Locking Device and an Assembled Product Comprising the Panels," filed in the U.S. Patent and Trademark Office filed Nov. 27, 2019.
Fridlund, Magnus, U.S. Appl. No. 16/703,077 entitled "Set of Panels for an Assembled Product," filed in the U.S. Patent and Trademark Office filed Dec. 4, 2019.
Derelöv, Peter, et al., U.S. Appl. No. 16/722,096 entitled "Panels Comprising a Mechanical Locking Device and an Assembled Product Comprising the Panels," filed in the U.S. Patent and Trademark Office filed Dec. 20, 2019.
Meijer, Thomas, U.S. Appl. No. 17/398,416 entitled "Panels with Edge Reinforcement," filed in the U.S. Patent and Trademark Office filed Aug. 10, 2021.
U.S. Appl. No. 16/220,574, Derelöv.
U.S. Appl. No. 16/220,585, Derelöv.
U.S. Appl. No. 16/361,609, Derelöv et al.
U.S. Appl. No. 16/386,732, Boo.
U.S. Appl. No. 16/386,810, Boo.
U.S. Appl. No. 16/386,824, Boo.
U.S. Appl. No. 16/386,874, Derelöv.
Derelöv, Peter, U.S. Appl. No. 16/220,574 entitled "Set of Panels," filed in the U.S. Patent and Trademark Office filed Dec. 14, 2018.
Derelöv, Peter, U.S. Appl. No. 16/220,585 entitled "Set of Panels," filed in the U.S. Patent and Trademark Office filed Dec. 14, 2018.
Derelöv, Peter, et al., U.S. Appl. No. 16/361,609 entitled "Panels Comprising a Mechanical Locking Device and an Assembled Product Comprising the Panels," filed in the U.S. Patent and Trademark Office filed Mar. 22, 2019.
Boo, Christian, U.S. Appl. No. 16/386,732 entitled "Set of Panels With a Mechanical Locking Device," filed in the U.S. Patent and Trademark Office filed Apr. 17, 2019.
Boo, Christian, U.S. Appl. No. 16/386,810 entitled "Set of Panels With a Mechanical Locking Device," filed in the U.S. Patent and Trademark Office filed Apr. 17, 2019.
Boo, Christian, U.S. Appl. No. 16/386,824 entitled "Set of Panels With a Mechanical Locking Device," filed in the U.S. Patent and Trademark Office filed Apr. 17, 2019.
Derelöv, Peter, U.S. Appl. No. 16/386,874 entitled "Symmetric Tongue and T-Cross," filed in the U.S. Patent and Trademark Office filed Apr. 17, 2019.
U.S. Appl. No. 16/861,639, Derelöv.
U.S. Appl. No. 16/946,047, Pervan.
U.S. Appl. No. 16/915,258, Brännström et al.
Derelöv, Peter, U.S. Appl. No. 16/861,639 entitled "Panels Comprising a Mechanical Locking Device and an Assembled Product Comprising the Panels," filed in the U.S. Patent and Trademark Office filed Apr. 29, 2020.
Pervan, Darko, U.S. Appl. No. 16/946,047 entitled "Mechanical Locking System for Building Panels," filed in the U.S. Patent and Trademark Office filed Jun. 4, 2020.
Brännström, Hans, et al., U.S. Appl. No. 16/915,258 entitled "Assembled Product and Method of Assembling the Assembled Product," filed in the U.S. Patent and Trademark Office filed Jun. 29, 2020.
U.S. Appl. No. 15/978,630, Fransson, et al.
U.S. Appl. No. 16/027,479, Boo, et al.
Fransson, Jonas, et al., U.S. Appl. No. 15/978,630 entitled "Elements and a Locking Device for an Assembled Product," filed in the U.S. Patent and Trademark Office filed May 14, 2018.
Boo, Christian, et al., U.S. Appl. No. 16/027,479 entitled "Panels Comprising a Mechanical Locking Device and an Assembled Product Comprising the Panels," filed in the U.S. Patent and Trademark Office filed Jul. 5, 2018.
Sostar, Marko, U.S. Appl. No. 17/514,055 entitled "Set of Panels, A Method for Assembly of the Same, and a Locking Device for a Furniture Product," filed in the U.S. Patent and Trademark Office filed Oct. 29, 2021.
Brännström, Hans, et al., U.S. Appl. No. 17/524,293 entitled "Assembled Product and a Method of Assembling the Assembled Product," filed in the U.S. Patent and Trademark Office filed Nov. 11, 2021.
Derelöv, Peter, et al., U.S. Appl. No. 17/546,356 entitled "Rail for Cabinets," filed in the U.S. Patent and Trademark Office filed Dec. 9, 2021.
Boo, Christian, U.S. Appl. No. 17/556,146 entitled "Wedge-shaped Tongue Groove," filed in the U.S. Patent and Trademark Office filed Dec. 20, 2021.
Rydsjö, Oscar, U.S. Appl. No. 17/665,160 entitled "Mounting Bracket," filed in the U.S. Patent and Trademark Office filed Feb. 4, 2022.

\* cited by examiner

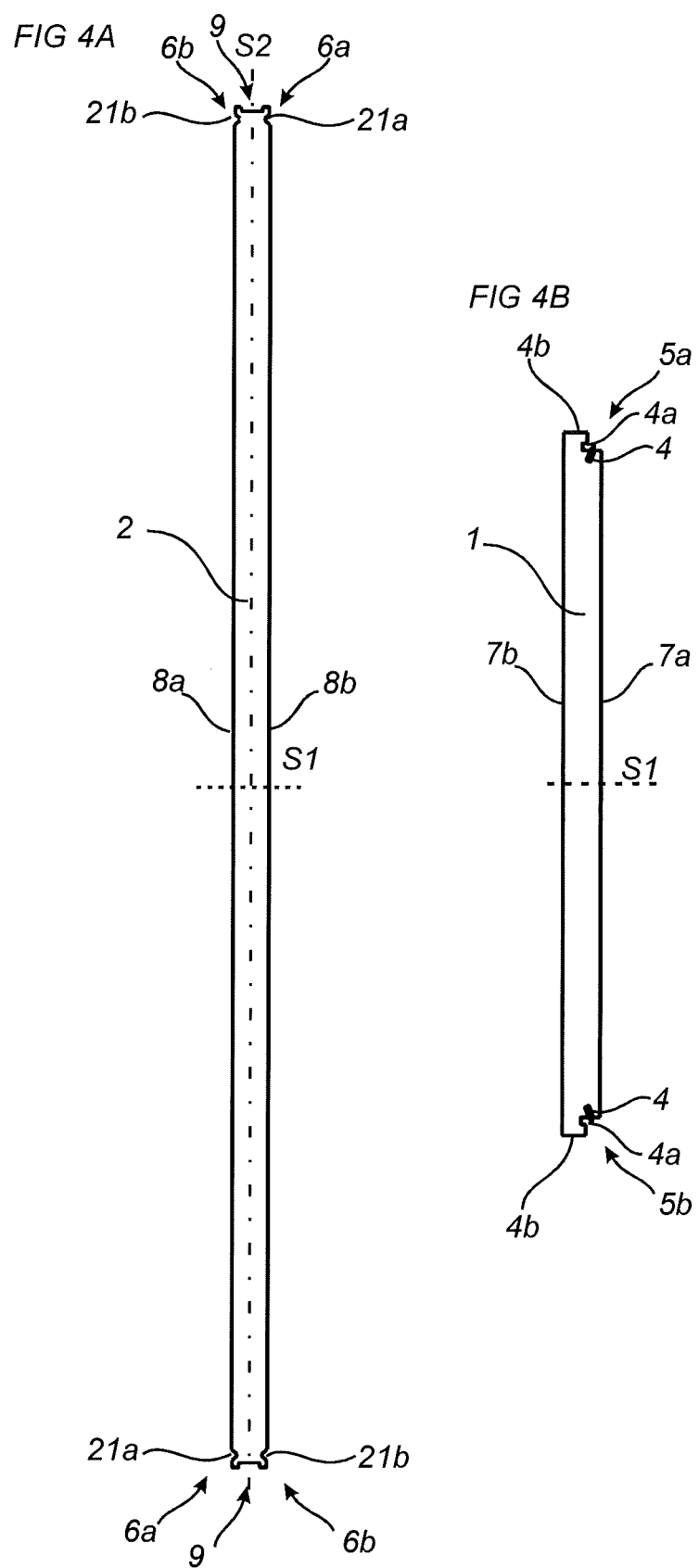

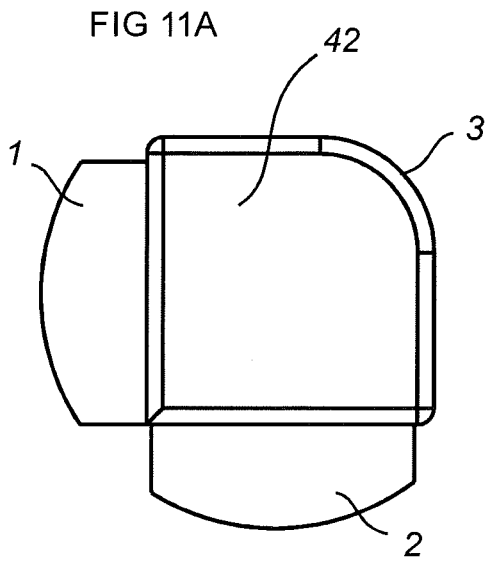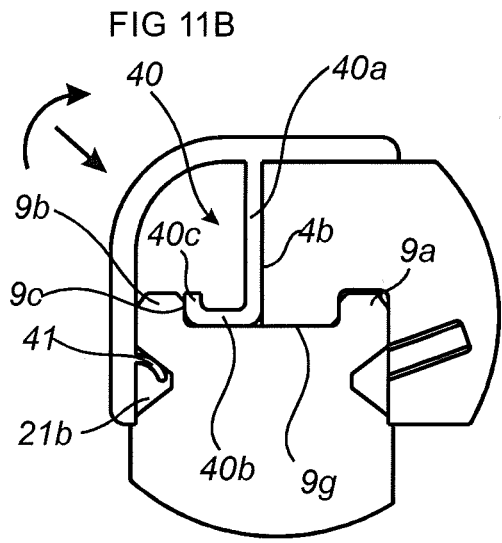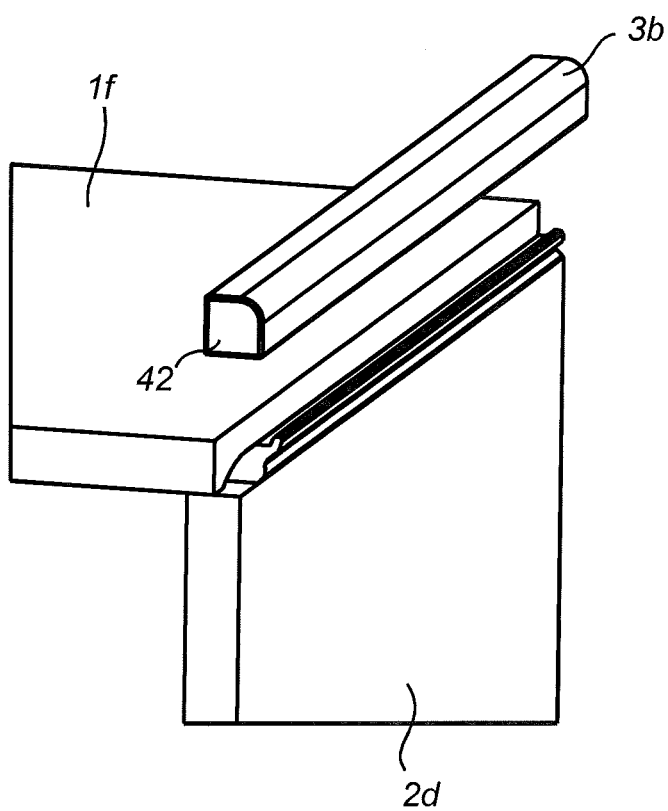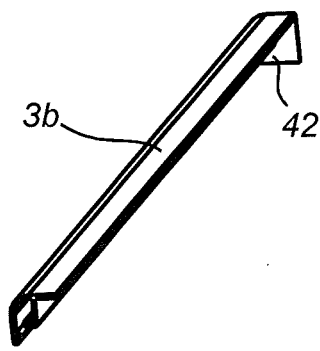

PANELS FOR AN ASSEMBLED PRODUCT

TECHNICAL FIELD

The present disclosure relates to panels for assembled products, such as panels for a multi-module frame. More particularly, embodiments according to the disclosure relate to a set of panels for an assembled product such as a furniture component, a frame of one or multiple modules, such as for wardrobes, cabinets or shelves, drawers, partitioning walls, etc.

BACKGROUND

A conventional furniture product is provided with a mechanical locking system as shown, for example, in WO2012/154113. The furniture product comprises a first panel connected perpendicularly to a second panel by a mechanical locking system comprising a flexible tongue in an insertion groove.

An assembled product may include at least three elements arranged in three different planes as shown, for example, in WO2015/038059. A first element is connected perpendicularly to a second element, and a third element is connected perpendicularly to the second element.

A composed element comprises at least two panel-shaped elements as shown, for example, in WO2010070605. The panel-shaped elements are interconnected at an angle by means of coupling means. The composed element may form multiple modules, such as shown in FIG. 40 of WO2010070605. This figure illustrates that at the same edge zone of a panel-shaped element, a plurality of grooves are present, which allow a coupling in T-connection or crosswise connection of several panel-shaped elements. The ends of each of two horizontal panel-shaped elements are connected to opposing side surfaces of a third vertical panel. This connection is fairly unstable. Also it is cumbersome to assemble; each horizontal panel-shaped element is attached separately to each vertical panel-shaped element. In some embodiments, such as illustrated in FIG. 62, a connecting piece is required to assemble multiple modules. A separate connecting piece also makes the composed element unstable and cumbersome to assemble. Additional components need to be produced, which adds complexity to production and logistics, and cost to the composed element.

The present disclosure addresses a widely recognized need to provide a set of panels for an assembled product that is easy to assemble, and provides for a stable assembled product, reduced complexity and/or reduced cost.

SUMMARY

Accordingly, embodiments according to the present disclosure preferably seek to mitigate, alleviate or eliminate one or more deficiencies, disadvantages or issues in the art, such as the above-identified, singly or in any combination by providing a set of panels according to the appended patent claims.

In some embodiments, a set of panels for an assembled product is provided. The set of panels comprises a first panel, a second panel, and a third panel. Each of the first panel and the second panel comprises a first surface, a second surface, which is substantially parallel with the first surface, an edge groove, and an end surface. The third panel comprises a first surface and a second surface, which is substantially parallel with the first surface, and an end surface extending at least partially between the first surface and the second surface of the third panel. The end surface of the third panel comprises a first tongue and a second tongue. The first panel and the second panel are configured to be arranged with their respective end surfaces facing each other, and with their respective edge grooves in parallel. The first tongue of the third panel is configured to be arranged in the edge groove of the first panel to join the first panel and the third panel, and the second tongue of the third panel is configured to be received in the edge groove of the second panel to join the second panel to the third panel. The first panel, the second panel, and the third panel may be joined at least in a first direction.

The first panel and the second panel may be configured to be arranged with their respective end surfaces in abutment.

Each of the first panel and the second panel may further comprise an insertion groove for a flexible tongue. The insertion groove may be arranged between the end surface and the first surface of the respective first panel and the second panel. The third panel may comprise a first tongue groove extending from the first surface thereof. A second tongue groove may extend from the second surface of the third panel. Each tongue groove may be arranged to receive a portion of the flexible tongue when the first panel, the second panel, and the third panel are joined.

At least one of the first panel and the second panel may comprise a flexible tongue formed integral with and in the same material as a material of the at least one of the first panel and the second panel.

Each insertion groove may be inclined towards the respective first surface of the first panel and the second panel. The respective first tongue and second tongue of the third panel may be arranged to push each flexible tongue into the insertion groove when the third panel is joined to the first panel and the second panel.

Each of the first panel and the second panel may comprise a tongue formed by the end surface and the edge groove thereof. The third panel may comprise at least one end groove between the first tongue and the second tongue thereof. The end groove may be at least partially formed by a lateral surface of the first tongue of the third panel and a lateral surface of the second tongue of the third panel, and a surface extending between the lateral surfaces. The third panel may comprise a single end groove between the first tongue and the second tongue of the third panel. The tongue of the first panel and the tongue of the second panel may be tongue portions of a multi-part tongue. The multi-part tongue may be formed when the first panel and the second panel are arranged with their respective end surfaces in abutment and with their respective edge grooves arranged in parallel. The multi-part tongue may be configured to be arranged in the single end groove of the third panel.

An end surface of the tongue of the first panel and an end surface of the tongue of the second panel may be configured to abut the end groove of the third panel. An end surface of the first tongue of the third panel may be configured to be spaced apart from a bottom wall of the edge groove of the first panel. An end surface of the second tongue of the third panel may be configured to be spaced apart from a bottom wall of the edge groove of the second panel, when the panels are assembled.

Alternatively, an end surface of the tongue of the first panel and an end surface of the tongue of the second panel may be configured to be spaced apart from the end groove of the third panel. An end surface of the first tongue of the third panel may be configured to abut a bottom wall of the edge groove of the first panel. An end surface of the second tongue of the third panel may be configured to abut a bottom wall of the edge groove of the second panel, when the panels are assembled.

Each of the first panel and the second panel may comprise at least one of a front edge and a back edge, which extends between the first surface and the second surface of the respective first panel and the second panel. One adjacent end of the edge groove of the respective first panel and the second may be spaced apart from the at least one of a front edge and a back edge.

In some embodiments, a set of panels are provided for forming a multi-module frame. The set of panels comprises a plurality of panels of a first panel type configured to be arranged in a first direction, a plurality of panels of a second panel type configured to be arranged in a second direction, which is substantially perpendicular to the first direction. The set of panels may also comprise at least one corner element. The panels of the first panel type comprise locking elements extending along edge portions of opposite ends of each panel. The panels of the second panel type comprise a first locking element and a second locking element arranged at the same end of the panel of the second panel type. The first locking element and the second locking element of the panels of the second panel type are directly lockable to either of the locking elements of the panels of the first panel type. The corner element, when provided, is attachable to at least one of the first locking element and the second locking element at one end of the panel of the second panel type when the panel of the second panel type is directly locked to a single panel of the first panel type.

The corner element may comprise at least one of a support element configured to be supported by at least one of the panel of the first panel type and the panel of the second panel type, and a locking element configured to lock against a tongue groove of the panel of the second panel type.

The set of panels may comprise panels for forming at least two modules of a multi-modular frame, including at least four panels of the first panel type, at least three panels of the second panel type. Optionally at least one corner element is provided. Each end of a first panel of the second panel type may be lockable to two panels of the first panel type, and each end of a second panel and a third panel of the second panel type may be lockable to a single panel of the first panel type. The corner element is attachable to at least one of the end of the second panel and the third panel of the second panel type when provided.

In the set of panels, a first panel may be of the first panel type, a second panel may be of the first panel type; and a third panel may be of the second panel type. Each of the first panel and the second panel may comprise a first surface, a second surface, which is substantially parallel with the first surface, an edge groove, and an end surface. The third panel may comprise a first surface and a second surface, which is substantially parallel with the first surface, and an end surface extending at least partially between the first surface and the second surface of the third panel. The end surface of the third panel may comprise a first tongue and a second tongue. The first panel and the second panel may be configured to be arranged with their respective end surfaces facing each other, and with their respective edge grooves in parallel. The first tongue of the third panel may be configured to be arranged in the edge groove of the first panel to join the first panel and the third panel. The second tongue of the third panel may be configured to be received in the edge groove of the second panel to join the second panel to the third panel. The first panel, the second panel, and the third panel may be joined at least in a first direction.

In the set of panels, the first panel and the second panel may be configured to be arranged with their respective end surfaces in abutment.

In the set of panels, each of the first panel and the second panel may further comprise an insertion groove for a flexible tongue. The insertion groove may be arranged between the end surface and the first surface of the respective first panel and the second panel. The third panel may comprise a first tongue groove extending from the first surface thereof and a second tongue groove extending from the second surface thereof. Each tongue groove may be arranged to receive a portion of the flexible tongue when the first panel, the second panel, and the third panel are joined.

In the set of panels, at least one of the first panel and the second panel may comprise a flexible tongue formed integral with and in the same material as a material of the at least one of the first panel and the second panel.

In the set of panels, each insertion groove may be inclined towards the respective first surface of the first panel and the second panel. The respective first tongue and second tongue of the third panel may be arranged to push each flexible tongue into the insertion groove when the third panel is joined to the first panel and the second panel.

In the set of panels, each of the first panel and the second panel may comprise a tongue formed by the end surface and the edge groove thereof. The third panel may comprise at least one end groove between the first tongue and the second tongue thereof.

In the set of panels, the end groove may be at least partially formed by a lateral surface of the first tongue of the third panel and a lateral surface of the second tongue of the third panel, and a surface extending between the lateral surfaces. The third panel may comprise a single end groove between the first tongue and the second tongue of the third panel. The tongue of the first panel and the tongue of the second panel may be tongue portions of a multi-part tongue. The multi-part tongue may be formed when the first panel and the second panel are arranged with their respective end surfaces in abutment and with their respective edge grooves arranged in parallel. The multi-part tongue may be configured to be arranged in the single end groove of the third panel.

In the set of panels, an end surface of the tongue of the first panel and an end surface of the tongue of the second panel may be configured to abut the end groove of the third panel. An end surface of the first tongue of the third panel may be configured to be spaced apart from a bottom wall of the edge groove of the first panel. An end surface of the second tongue of the third panel may be configured to be spaced apart from a bottom wall of the edge groove of the second panel, when the panels are assembled. Alternatively, an end surface of the tongue of the first panel and an end surface of the tongue of the second panel may be configured to be spaced apart from the end groove of the third panel. An end surface of the first tongue of the third panel may be configured to abut a bottom wall of the edge groove of the first panel. An end surface of the second tongue of the third panel may be configured to abut a bottom wall of the edge groove of the second panel, when the panels are assembled.

In the set of panels, each of the first panel and the second panel may comprise at least one of a front edge and a back edge, which extends between the first surface and the second surface of the respective first panel and the second panel. One adjacent end of the edge groove of the respective first panel and the second panel may be spaced apart from the at least one of a front edge and a back edge.

Some embodiments according to the disclosure provide for an assembled product that is easy to assemble. Particularly, the assembled product may be composed of only two types of panels that may be locked relative each other without any separate fastening elements, such as bolts or screws. Also, the panels may be assembled without using any tools. Hence, the panels are also quick to assemble. Furthermore, the design of the panels provides for a stable assembled product. Also, the need of only two types of panels, and an optional corner element, reduces complexity, which in turn reduces complexity to produce and assemble. Reduced complexity as well as few parts that need to be produced also reduces production and logistic costs.

The term "comprises/comprising" when used in this specification is taken to specify the presence of stated features, integers, steps or components but does not preclude the presence or addition of one or more other features, integers, steps, components or groups thereof.

BRIEF DESCRIPTION OF THE DRAWINGS

These and other aspects, features and advantages of which embodiments according to the present disclosure are capable of, will be apparent and elucidated from the following description of embodiments, reference being made to the accompanying drawings, in which:

FIG. 213 is an enlarged side view of the front side of the panels illustrated in FIG. 1C;

FIG. 4A is a side view of an embodiment of the panel of the second panel type;

FIG. 4B is a side view of an embodiment of the panel of the first panel type;

FIGS. 11A-11B are side views of the front side and the back side, respectively, of an embodiment of a corner element assembled with panels;

FIGS. 11C-11D are perspective views illustrating opposing ends of the corner element of FIGS. 11A-11C.

DESCRIPTION OF EMBODIMENTS

Figure 1A:
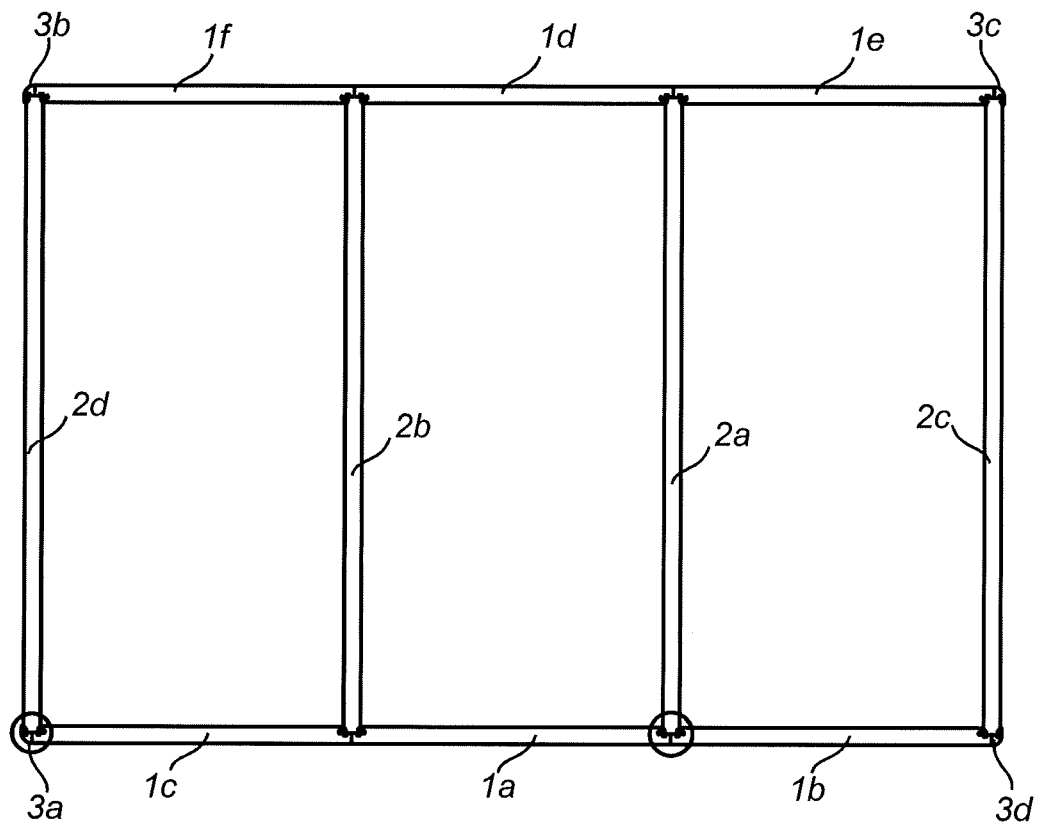
FIG. 1A is a side view of the back side of an embodiment of an assembled product.

Specific embodiments according to the disclosure now will be described with reference to the accompanying drawings. This disclosure may, however, be embodied in many different forms and should not be construed as limited to the embodiments set forth herein; rather, these embodiments are provided so that this disclosure will be thorough and complete, and will fully convey the scope of the disclosure to those skilled in the art. The terminology used in the detailed description of the embodiments illustrated in the accompanying drawings is not intended to be limiting of the disclosure. In the drawings, like numbers refer to like elements.

Figure 1B:
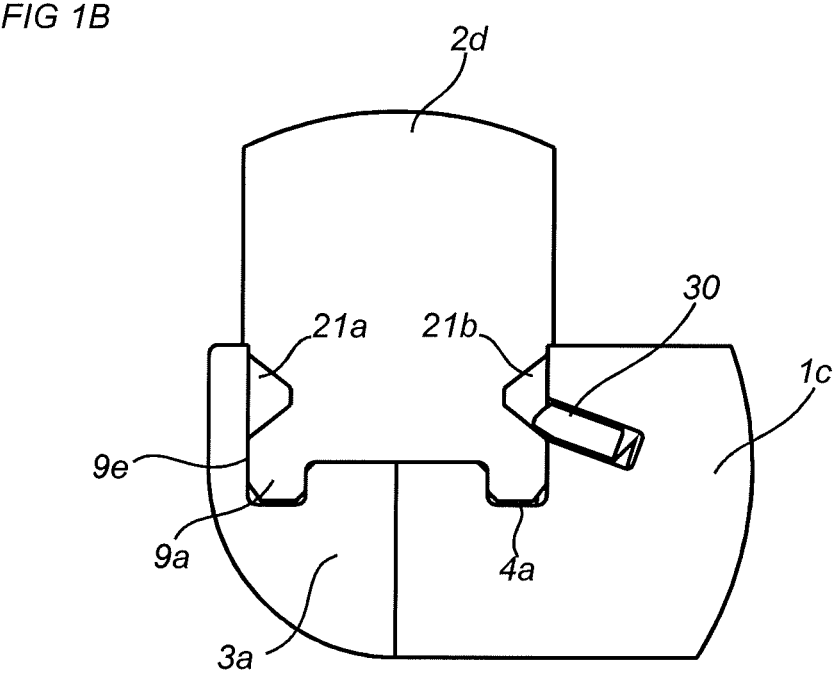
FIG. 1B is an enlarged side view of the back side of a corner of the assembled product of FIG. 1A.
Figure 1C:
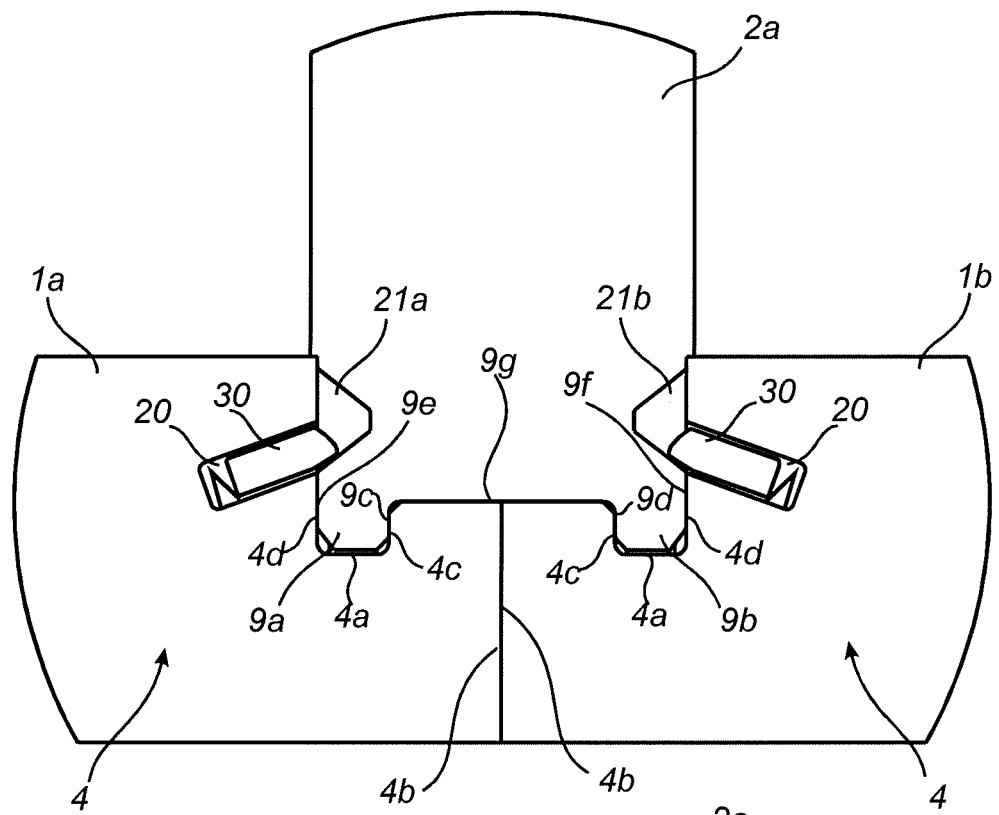
FIG. 1C is an enlarged side view the back side of the assembled product of FIG. 1A with a first panel arranged in abutment with a second panel, and a third panel with locking elements joining the panels together.

The disclosure concerns a set of panels for an assembled product, such as illustrated in FIG. 1A. The set of panels comprises a first panel 1a, a second panel 1b, and a third panel 2a. The first panel 1a, the second panel 1b, and the third panel 3a may be joined, such as illustrated in FIG. 1C. Particularly, the first panel 1a, the second panel 1b, and the third panel 3a may be locked to each other in at least one direction. Hence, the three panels may form a joint of the assembled product.

Figure 2A:
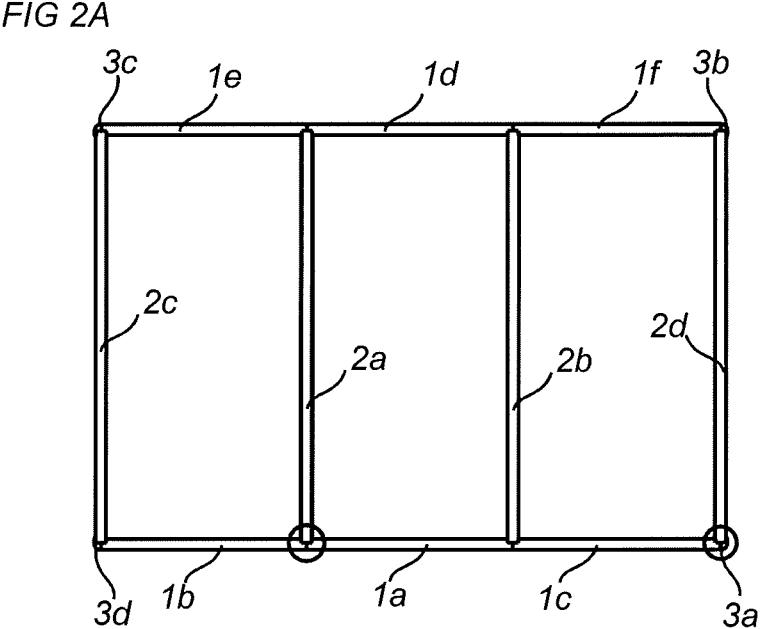
FIG. 2A is a side view of the front side of the embodiment of the assembled product of FIG. 1A.
Figure 2B:
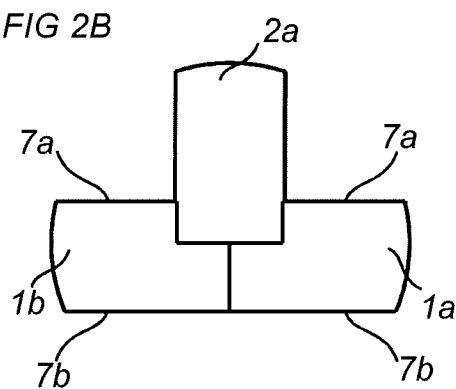
FIG. 2C is an enlarged side view of the front side of the corner illustrated in FIG. 1B.
FIG. 2D is a side view of the side of the assembled product of FIG. 1A.
Figure 2C:
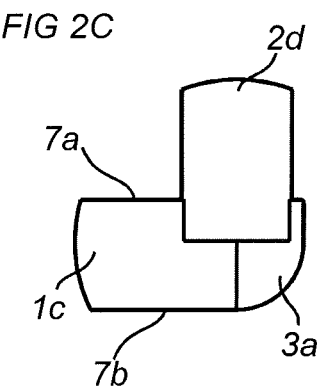
Figure 2D:
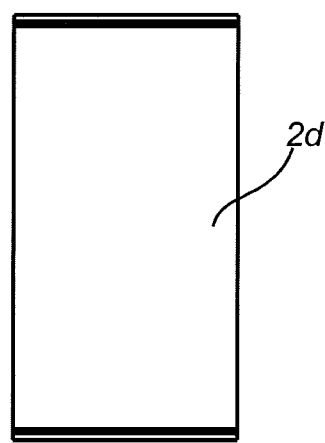
Figure 5:
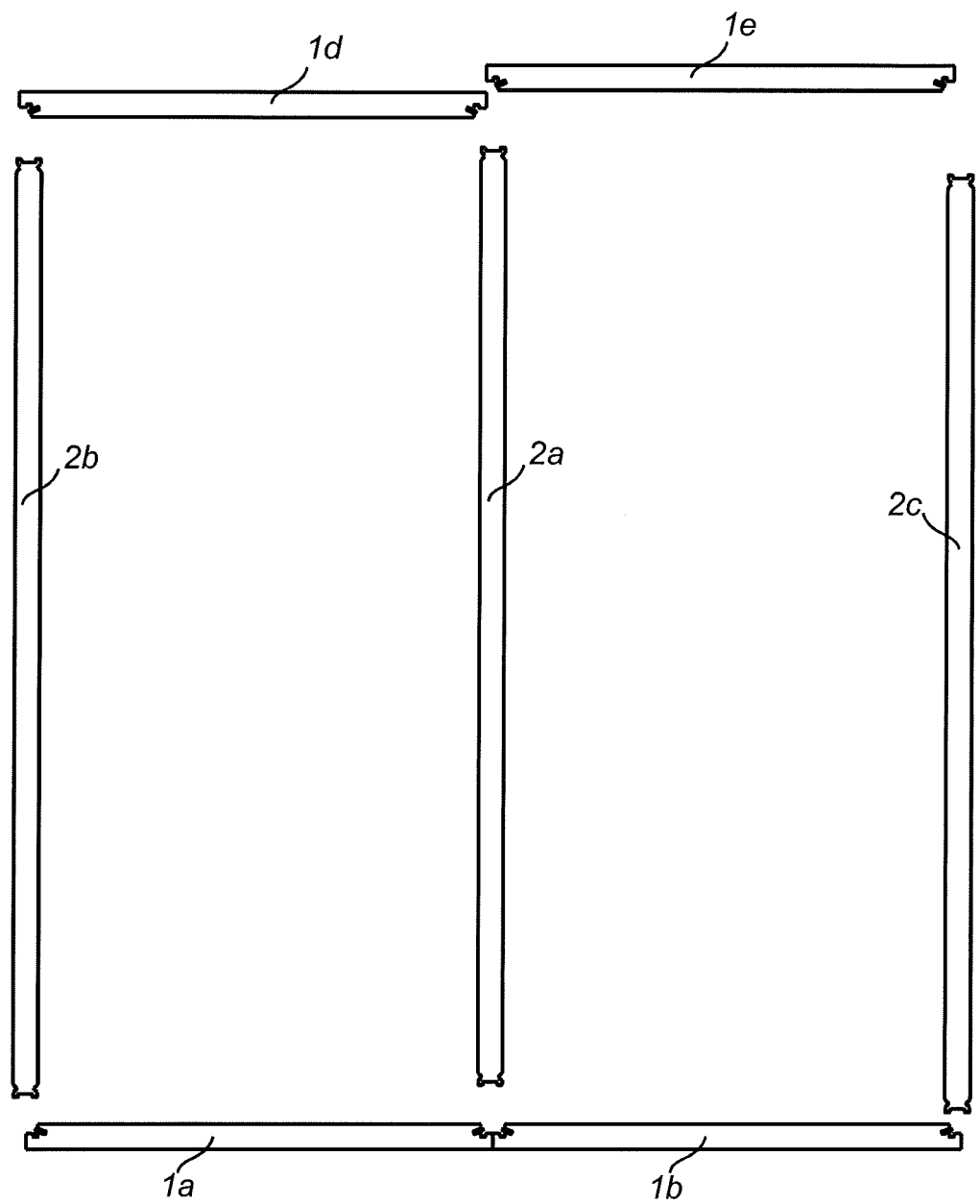
FIG. 5 is an exploded view of an embodiment of a set of panels for an assembled product including panels of the first panel type and panels of the second panel type.
Figure 6A:
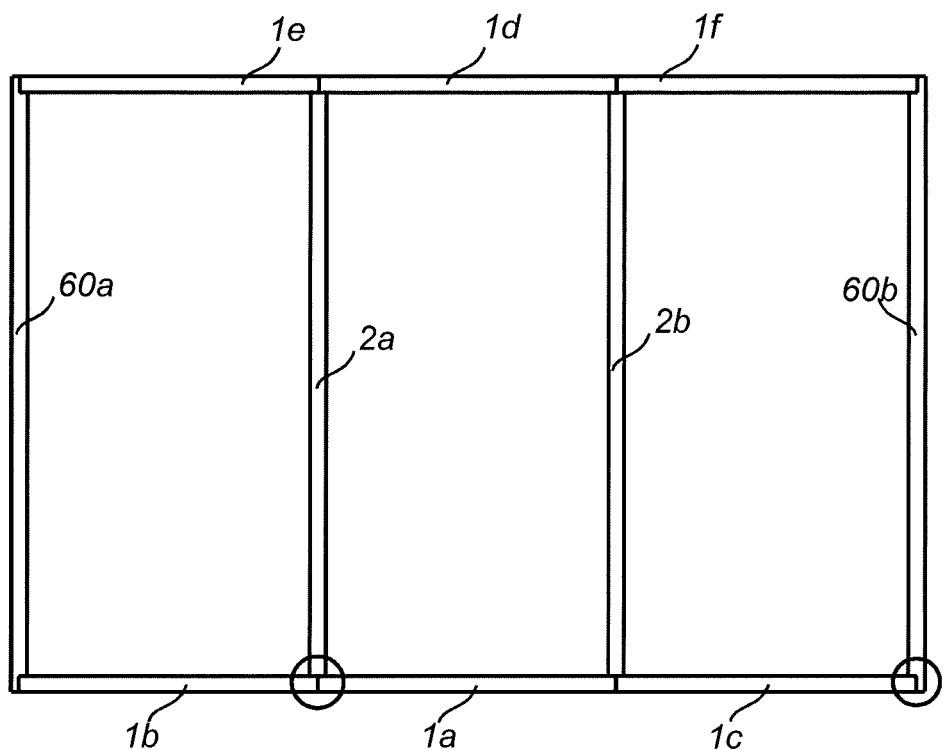
FIG. 6A is a side view of the front side of an embodiment of an assembled product.
Figure 6B:
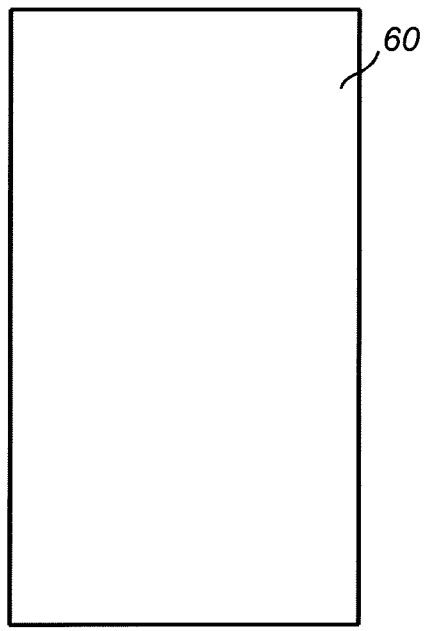
FIG. 6B is a side view of the side of the assembled product of FIG. 6A.
Figure 6C:
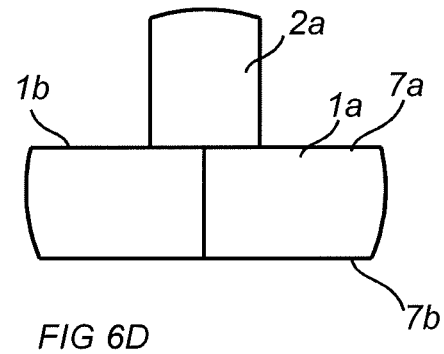
FIG. 6C is an enlarged side view the back side of the assembled product of FIG. 6A with a first panel arranged in abutment with a second panel, and a third panel with locking elements joining the panels together.
Figure 6D:
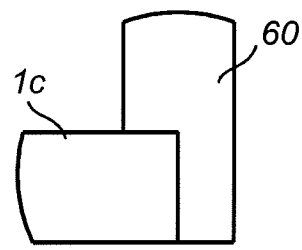
FIG. 6D is an enlarged side view of the front side of a corner of the assembled product of FIG. 6A.
Figure 7A:
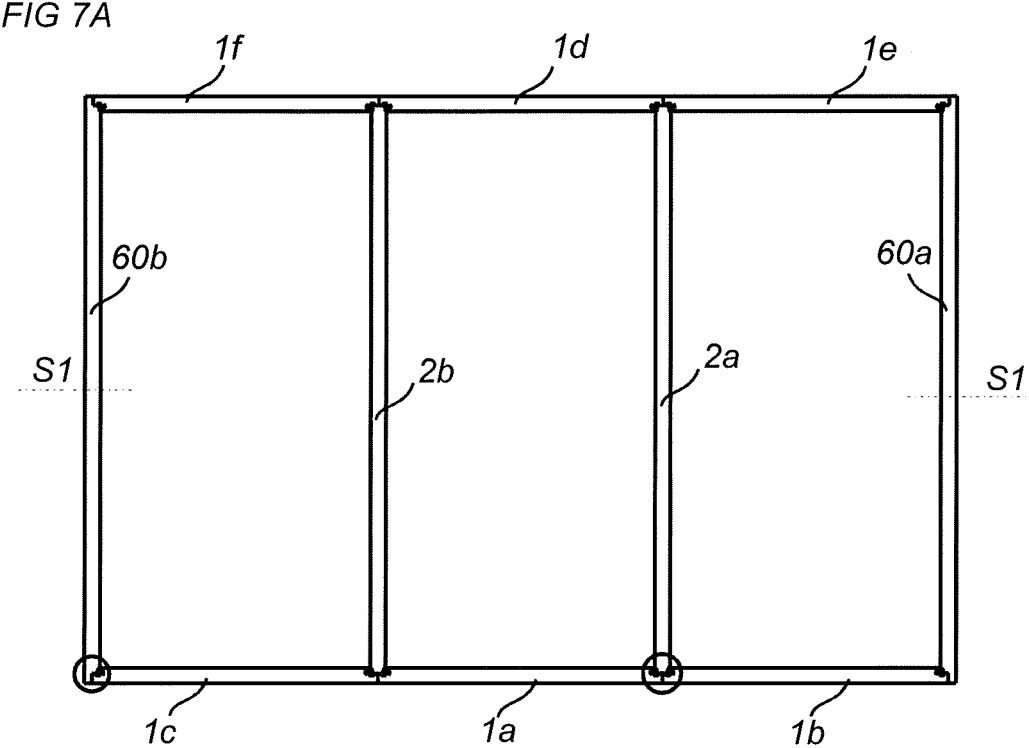
FIG. 7A is a side view of the back side of the embodiment of the assembled product of FIG. 6A.

In some embodiments, a set of panels may be used to form a multi-module frame, such as illustrated in the embodiments of FIGS. 1A and 2A, FIG. 5, and FIG. 6A and FIG. 7A. FIGS. 1A and 7A illustrate the back side of embodiments of multi-module frames. FIG. 2A illustrates the front side of multi-module frame of FIG. 1A, and FIG. 6A illustrates the front side of the multi-module frame of FIG. 7A.

An entire multi-module frame may be assembled using only a plurality of panels of a first panel type and a plurality of panels of a second panel types. FIG. 4B illustrates an embodiment of the panel 1 of the first panel type. FIG. 4A illustrates an embodiment of the panel 2 of the second panel type.

The first panel 1*a* and the second panel 1*b* may be of the first panel type. The third panel 2*a* may be of the second panel type. In order to firm a single joint, it is only required to have the first panel 1*a*, the second panel 1*b* and the third panel 2*a*.

As is illustrated in FIGS. 1A and 2A, FIG. 5, and FIG. 6A and FIG. 7A the panel of the first panel type, such as panels 1*a*-1*e*, are configured to be arranged in a first direction, such as horizontally. The panel of the second panel type, such as panels 2*a*-2*d*, is configured to be arranged in a second direction, such as vertically. The second direction may be substantially perpendicular to the first direction.

In some embodiment, such as illustrated in the embodiment of FIG. 1A, at least one corner element 3*a*-3*c* may be included with the set of panels.

The corner element 3*a*-3*c* may be attached to at least one of the panel 1 of the first panel type or the panel 2 of the second panel type. As is illustrated in FIG. 1B, the corner element 3*a*-3*c* may be attached to the panel 2 of the second panel type. A panel 1 of the first panel type may be attached at the same corner of the panel 2 of the second panel type, to which the corner element 3*a*-3*c* is attached, as is illustrated in FIG. 1B. The corner element 3*a*-3*c* may extend along the length of an edge of the panel 2 of the second panel type, such as the upper/lower edge of a rectangular panel. Hence, the corner element 3*a*-3*c* may be used to conceal or cover any structure of the panel 1, 2 of the first and/or second panel type, which is less visibly appealing. Hence, a corner element 3*a*-3*c* may be used at any corner that is visible when the product, assembled by the panels 1*a*-1*e*, 2*a*-2*b*, is positioned in a final position for use. Hence, in some situations only two corner elements 3*a*-3*c* may be needed, such as when the assembled product is positioned with a side surface, such as a surface perpendicular to the front or back side, against wall. However, in other situations, four corner elements 3*a*-3*c*, one at each outer corner of the assembled product, are used. Only a single or three corner elements 3*a*-3*c* are also contemplated.

As shown for example in FIG. 1C, an end surface of the tongue of the first panel 1*a* and an end surface of the tongue of the second panel 1*b* are configured to abut the end groove of the third panel 2*a*, and an end surface of the first tongue 9*a* of the third panel 2*a* is configured to be spaced apart from a bottom wall of the edge groove 4*a* of the first panel and an end surface of the second tongue 9*b* of the third panel 2*a* is configured to be spaced apart from a bottom wall of the edge groove 4*a* of the second panel 1*b*, when the panels are assembled.

Figure 1D:
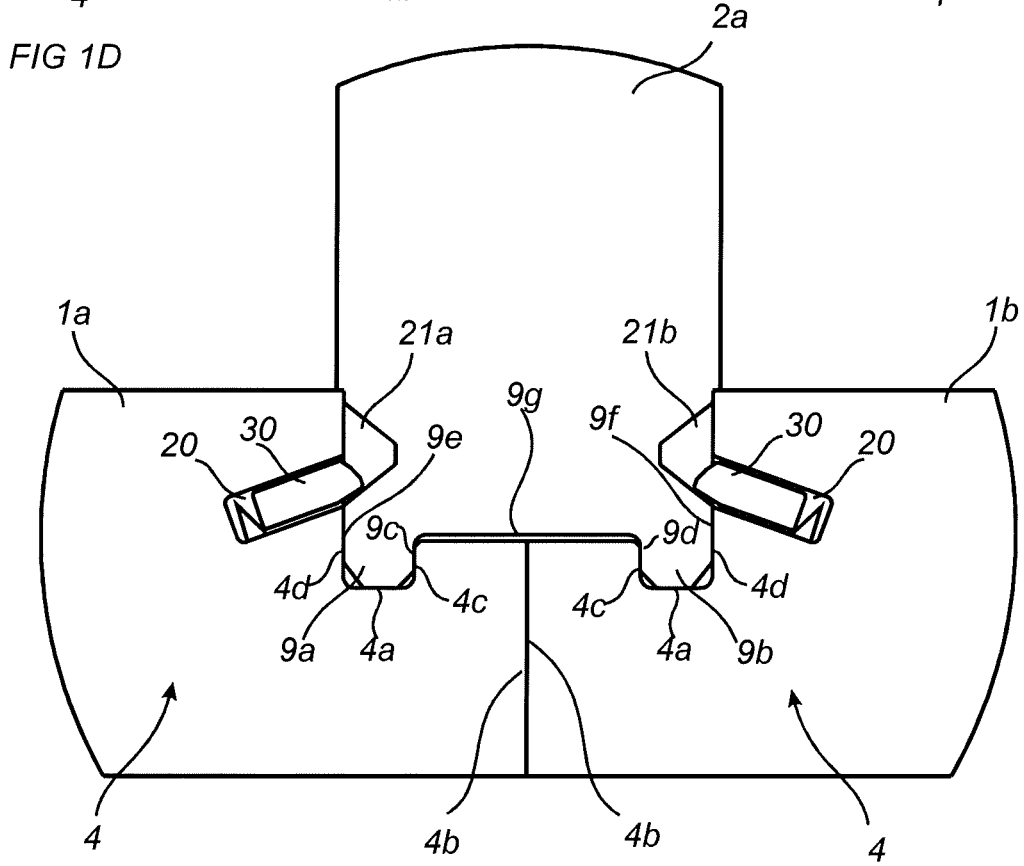
FIG. 1D is an enlarged side view of the back side of an alternative to the embodiment of the assembled product of FIG. 1A.

Alternatively, as shown for example in FIG. 1D, an end surface of the tongue of the first panel 1*a* and an end surface of the tongue of the second panel 1*b* are configured to be spaced apart from the end groove of the third panel 2*a*, and an end surface of the first tongue 9*a* of the third panel 2*a* is configured to abut a bottom wall of the edge groove 4*a* of the first panel 1*a* and an end surface of the second tongue 9*b* of the third panel 2*a* is configured to abut a bottom wall of the edge groove 4*a* of the second panel 1*b*, when the panels are assembled.

Figure 7B:
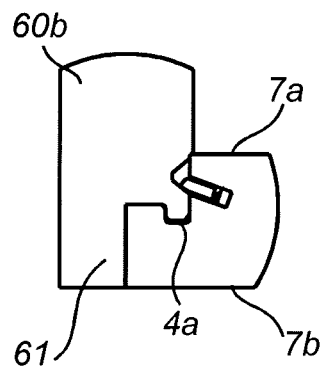
FIG. 7B is an enlarged side view of the back side of the corner illustrated in FIG. 6D.
Figure 7C:
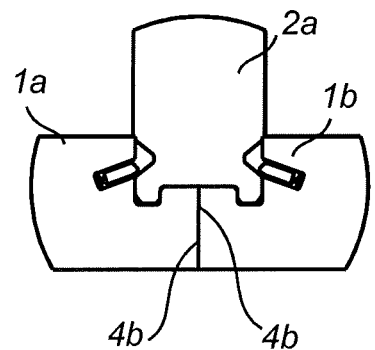
FIG. 7C is an enlarged side view the back side of the panels illustrated in FIG. 6C.

As is illustrated in the embodiments of FIGS. 1C and 7C, and which can also be seen in FIGS. 3B, 4A, 8A, 10A, 10B and 11C, the panel 1 of the first panel type comprises a locking element 4 extending at least partially along an edge portion 5. In some embodiments, a locking element 4 extends along each edge portion 5*a*, 5*b* of opposite ends of the panel 1, as is illustrated by the panel 1 in FIG. 4*b*. The panel 1 of the first panel type may have a locking element 4 at each of opposing ends of the panel 1, as is illustrated in FIG. 4B. Hence, locking elements 4 may be symmetrically arranged at each end of the panel 1 of the first panel type. Hence, the panel 1 may be symmetric at each end, such as relative to a centre line S1 which is normal to a first surface 7*a* and a second surface 7*b* of the panel 1 of the first panel type. The centre line S1 may extend at the centre between each end of the panel 1 of the first panel type. Hence, the panel 1 of the first panel type may be symmetric about the centre line S1. Hence, the panel 1 of the first panel type may be connected at each end to a panel 2 of the second panel type, is illustrated in FIG. 1A.

Similarly and as can be seen in FIG. 4A, the panel 2 of the second panel type, such as panels 2*a*-2*d*, comprises a first locking element 6*a* and a second locking element 6*b* arranged at the same end of the panel 2 of the second panel type. The panel 2 of the second panel type may have a first locking element 6*a* and a second locking element 6*b* at each of opposing ends of the panel 2, as is illustrated in FIG. 4*a*. Hence, locking elements may be symmetrically arranged at each end of the panel 2 of the second panel type, such as relative a centre line S1 which is normal to a first surface 8*a* and a second surface 8*b* of the panel 2 of the second panel type. The centre line S1 may extend at the centre between each end of the panel 2 of the second panel type. Hence, the panel 2 of the second panel type may be symmetric about the centre line S1. Also, the first locking element 6*a* and the second locking element 6*b* may be symmetrically arranged along the edges of each end. Thus, the locking elements 6*a*, 6*b* may be symmetric at each end about a second centre line S2. The second centre line S2 may extend parallel with the first surface 8*a* and the second surface 8*b* of the panel 2 of the second panel type, such as in the centre between the first locking element 6*a* and the second element 6*b* and/or in the centre between the first surface 8*a* and the second surface 8*b* of the panel 2 of the second panel type. Hence, the entire panel 2 may be symmetric. Hence, each panel 2 of the second panel type may connect four panels 1 of the first panel type, e.g. that together form a bottom surface and a top surface, respectively, of a multi-module frame.

Each of the first locking element 6*a* and the second locking element 6*b* of the panel 2 of the second panel type is directly lockable to either of the locking elements 4 of the panel 1 of the first panel type.

The corner element 3*a*-3*c* may be attachable to at least one of the first locking element 6*a* and the second locking element 6*b* at one end of the panel 2 of the second panel type. As is illustrated in FIG. 1B, when the panel 2*d* of the second panel type is directly locked to a single panel 1 of the first panel type, such as to a panel of an outermost module of a multi-module frame, one of the locking elements 6*a*, 6*b* of an outermost panel of the outermost module is exposed, i.e. not connected to a panel 1 of the first panel type. The corner element 3*a*-3*c* may be attached to any such exposed locking element 6*a*, 6*b*.

As is illustrated in FIG. 4B, the panel 1 of the first panel type, such as each of the first panel 1*a* and the second panel 1*b*, comprises a first surface 7*a*, and a second surface 7*b*. The second surface 7*b* may be substantially parallel with and offset from the first surface 7*a*, such that the panel has a predefined thickness. Also, the panel 1 of the first panel type may comprise at least one edge groove 4*a*, and at least one end surface 4*b*, such as at each end of the panel 1. The at least one edge groove 4*a* and the at least one end surface 4*b* may extend at least partially along the edge of the panel 1 of the first panel type.

As is illustrated in FIG. 4A, the panel 2 of the second panel type, such as the third panel 2*a*, may comprise the first surface 8*a*, and the second surface 8*b*. The second surface 8*b* may be substantially parallel with and offset from the first surface 8*a*, such that the panel 2 has a predefined thickness. An end surface 9 may extend at least partially between the first surface 8*a* and the second surface 8*b* of the panel 2 of the second panel type. Each end of the panel 2 of the second panel type may comprise such an end surface 9. The end surface 9 of the panel 2 of the second panel type, such as the third panel 2*a*, may comprise a first tongue 9*a*. The panel 2 of the second panel type may also comprise a second tongue 9*b*. The first tongue 9*a* and/or the second tongue 9 may extend at least partially along the end surface 9.

As is illustrated in FIGS. 1C and 7C, the panels of the first panel type, such as the first panel 1*a* and the second panel 1*b*, may be configured to be arranged with their respective end surfaces 4*b* facing each other, and with their respective edge grooves 4*a* in parallel. The first tongue 9*a* of the panel 2 of the first panel type, such as the third panel 2*a*, may be configured to be arranged in the edge groove 4*a* of the first panel 2*a* to join the first panel 1*a* and the third panel 2*a*. The second tongue 9*b* of the panel 2 of the second panel type, such as the third panel 2*a*, may be configured to be received in the edge groove 4*a* of the second panel 1*b*. Hence, the third panel 2*a* may join the second panel 2*b* to the third panel 2*b*, whereby the first panel 1*a*, the second panel 2*b*, and the third panel 2*a* are joined at least in a first direction, such as in the direction of extension of first surface 7*a* and second surface 7*b* of the first panel 1*a* and the second panel 1*b*, respectively.

As is illustrated in FIGS. 1C and 7C, in some embodiments, panels 1 of the first panel type, such as the first panel 1*a* and the second panel 1*b*, are configured to be arranged with their respective end surfaces 4*b* in abutment when assembled. This provides for a stable joint, wherein the end surfaces may be pushed together when the tongues 9*a*, 9*b* are inserted into the respective edge groove 4*a* of the first panel 1*a* and second panel 1*b*.

In some embodiments, a side surface 9*c*, 9*d* of each tongue 9*a*, 9*b* facing the centre of the panel 2 of the second panel type may be configured to abut a first side wall 4*c* of the edge groove 4*a* of the panel 1 of the first panel type. Hence, the side surfaces 9*a*, 9*b*, and the first side wall 4*c* of the edge groove 4*a* may extend in parallel with the extension of the first surface 8*a* and the second surface 8*b* of the panel 2 of the second panel type. Hence, the side surfaces 9*c*, 9*d*, and the first side wall 4*c*, of the edge groove 4*a* may extend perpendicularly with the extension of the first surface 7*a*, and the second surface 7*b* of the panel 1 of the first panel type.

In other embodiments, panels 1 of the first panel type, such as the first panel 1*a* and the second panel 1*b*, are configured to be arranged with their respective end surfaces 4*b* spaced apart when assembled with a panel 2 of the second panel type. A gap may be provided between the end surfaces 4*b*. The gap may be unfilled. This may save material during production. Instead, second side surfaces 9*e*, 9*f* of each tongue 9*a*, 9*b* facing away from the centre of the panel 2 of the second panel type may be configured to abut a second side wall 4*d* of the edge groove 4*a* of the panel 1 of the first panel type. Hence, the second side surfaces 9*e*, 9*f*, and the second side wall 4*d* of the edge groove 4*a* may extend in parallel with the extension of the first surface 8*a* and the second surface 8*b* of the panel 2 of the second panel type. Hence, the side surfaces 9*c*, 9*d*, and the second side wall 4*d*, of the edge groove 4*a* may extend perpendicularly with the extension of the first surface 7*a*, and the second surface 7*b* of the panel 1 of the first panel type.

As is illustrated in FIGS. 1C and 7C, the edge groove 4*a* of the panel of the first panel type may comprise the first wall 4*c* and the second wall 4*d* configured to be in abutment with the first side surface 9*c*, 9*d* and the second side surface 9*e*, 9*f*, respectively, of each tongue 9*a*, 9*b* of the panel 2 of the second panel type. This provides for a stable joint. Furthermore, this provides for easy assembly, since the first panel 1*a* and the second panel 1*b* will not be pushed apart when the tongues 9*a*, 9*b*, are inserted into the edge grooves 4*a*. Additionally, in some embodiments the end surfaces 4*b* are also in abutment which further facilitates assembly as well as stabilizes the joint. When the end surfaces 4*b* are in abutment already before the tongues 9*a*, 9*b* are inserted, the edge grooves 4*a* may be arranged in parallel and at a predefined distance. This makes it easier to insert the tongues 9*a*, 9*b* of the panel 2 of the second panel type. This is further enhanced when the tongues 9*a*, 9*b* are symmetrical at the same end of the panel 2 of the second panel type, and the edge grooves 4*a* are symmetric at the opposing ends of the panel 1 of the first panel type.

As is illustrated in FIGS. 1C and 7C, and FIGS. 9A-9l, the panel 1 of the first panel type, such as each of the first panel 1*a* and the second panel 1*b*, may comprise an insertion groove 20 for a flexible tongue 30, such as at each end thereof. Each insertion groove 20 may be arranged between the end surface 4*b* and the first surface 7*a* of the panel 1 of the first panel type, such as the first panel 1*a* and the second panel 1*b*. The panel 2 of the second panel type, such as the third panel 2*a*, may comprise a first tongue groove 21*a* extending from the first surface thereof 8*a*. In some embodiments, the panel 2 of the second panel type also comprises a second tongue groove 21*b* extending from the second surface 8*b* thereof. Each tongue groove 21*a*, 21*b* may be arranged to receive a portion of the flexible tongue 30 when the first panel 1*a*, the second panel 1*b*, and the third panel 2*a* are joined. Hence, the first panel 1*a*, the second panel 1*b*, and the third panel 2*a* may be joined and/or locked in a second direction, which may be perpendicular to the first direction in which the panels are joined and/or locked. Also, the arrangement of the flexible tongue 30 and tongue groove 21*a*, 21*b* may form a tight joint. Since the tongue 30 is flexible, it may be displaced in the tongue insertion groove 20 by the first tongue 9*a* or the second tongue 9*b* of the third panel 2*a* while the third panel 2*a* is positioned in its seated position relative the first panel 1*a* and the second panel 2*b*. Flexible tongues 30 of the first panel 1*a* and the second panel 2*b* may be arranged symmetrically around the third panel 2*a* during assembly, such that they are displaced simultaneously. Hence, easy and simultaneous assembly of the third panel with the first panel and the second panel is facilitated for.

Figure 8A:
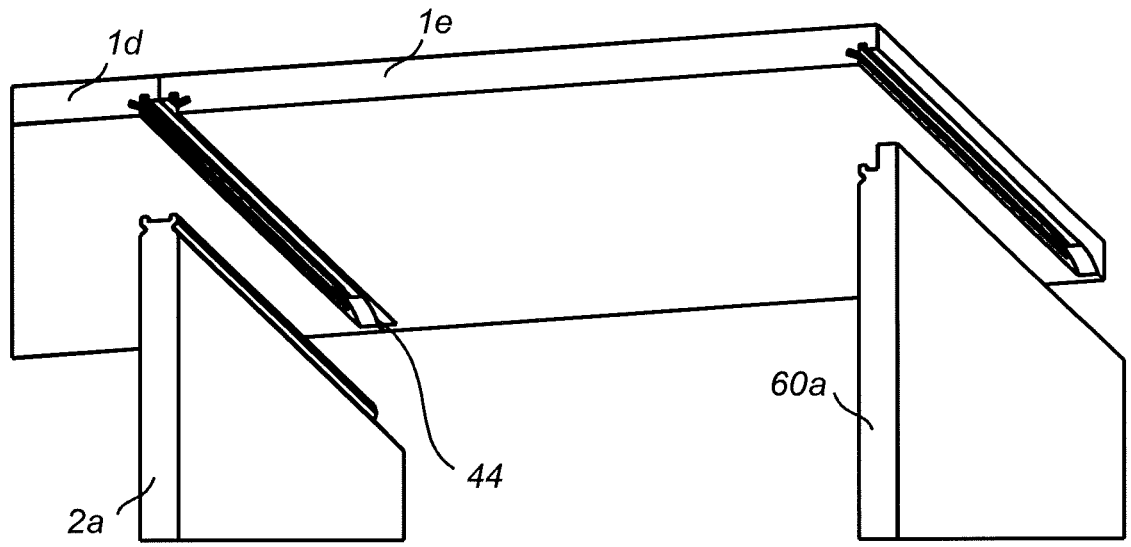
FIG. 8A is an exploded view illustrating assembly of panels of the first panel type with panels of the second panel type.
Figure 8B:
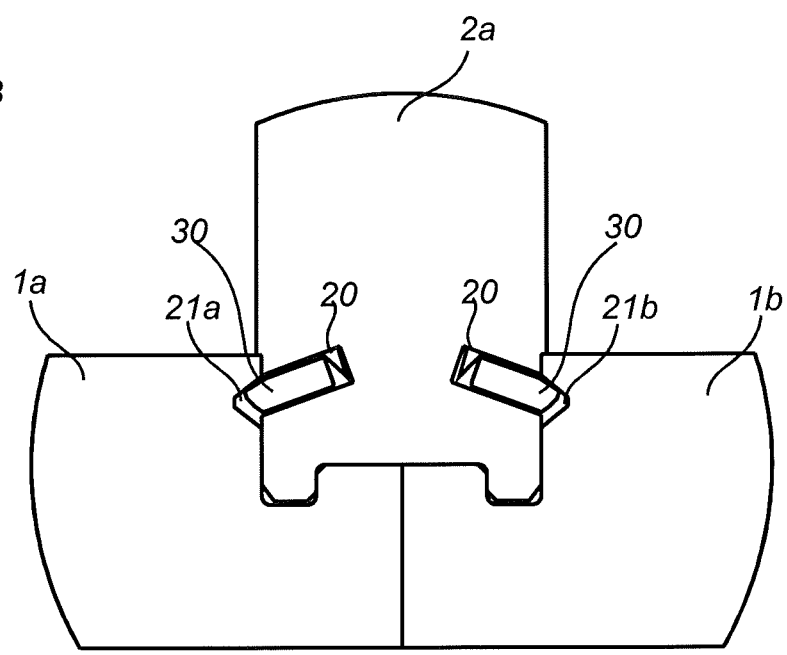
FIG. 8B illustrates an enlarged view of panels of the first panel type joined with a panel of the second panel type with locking elements.

FIG. 8B illustrates an embodiment wherein the locking element with the flexible tongues 30 are positioned in insertion grooves 20 in the panel 2 of the second panel type. The tongue groove 21*a*, 21*b* is arranged in the panel 1 of the first panel type. The function of the locking element of FIG. 8B corresponds to the function of the locking element discussed above as well as below.

Figure 9A:
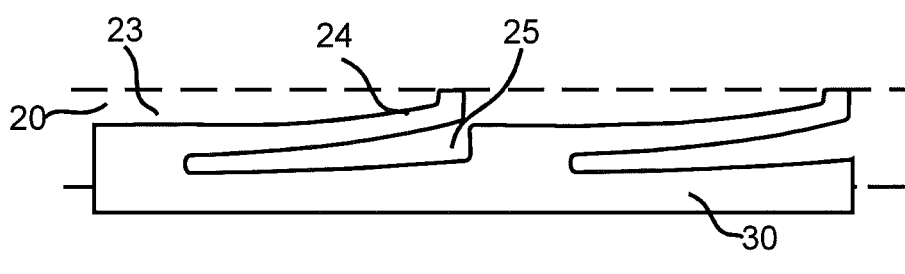
FIGS. 9A-9J are top and side views of embodiments of locking elements.
Figure 9B:
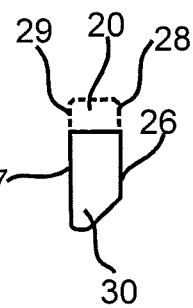
Figure 9C:
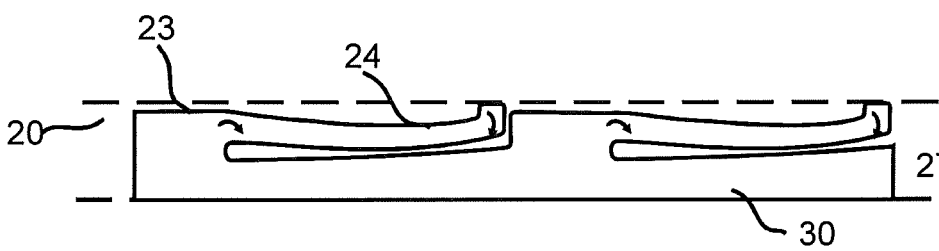
Figure 9D:
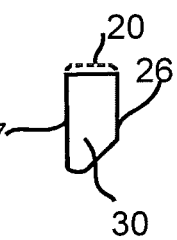

Embodiments of the flexible tongue 30, which is displaceable in the insertion groove 20, are shown in FIGS. 9A-9D. FIGS. 9A-9B show the flexible tongue 30 in a locked position and FIGS. 9C-9D show the flexible tongue 30 during assembling of the third panel 2*a* and the first panel 1*a* and/or the second panel 1*b*. FIG. 9B shows a cross section of the flexible tongue 30 in FIG. 9A, which shows a top view. FIG. 9D shows a cross section of the flexile tongue 30 in FIG. 9C, which shows a top view. The flexible tongue 30 comprises bendable protruding parts 24. A space 23 is provided between the flexible tongue 30 and a bottom wall of the insertion groove 20. FIG. 9C shows that the flexible tongue 30 is pushed into the insertion groove 20 and towards the bottom wall of the insertion groove 20 during an assembly of the third panel 2*a* with the first panel 1*a* and/or second panel 1*b*. The flexible tongue 30 springs back towards its initial position when the third panel 2*a* has reached a locked position relative the first panel 1*a* and/or the second panel 1*b*. A recess 25 is preferably arranged at each bendable protruding part.

The flexible tongue 30 may have a first displacement surface 26 and an opposite second displacement surface 27, configured to be displaced along a third displacement surface 28 and a fourth displacement surface 29, respectively, of the insertion groove 20.

Figure 9E:
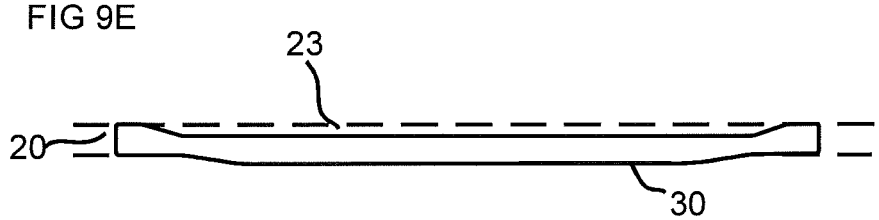
Figure 9F:
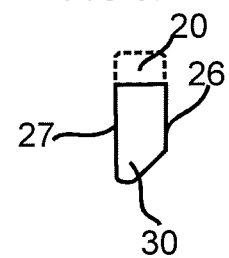

Another embodiment of the flexible tongue 30, without the protruding bendable parts 24, is shown in FIGS. 9E-9F. FIG. 9F shows a cross section of the flexible tongue 30 shown in FIG. 9E, which shows a top view. The alternative embodiment is bendable in the length direction of the flexible tongue 30 in order to accomplish a similar function as the embodiment shown in FIGS. 9A-9D.

Figure 9G:
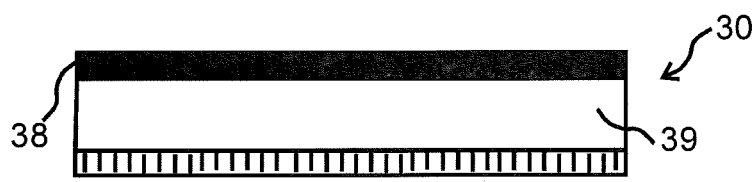

Another embodiment of the flexible tongue 30 is shown in FIG. 9G in a top view. The tongue 30 comprises an inner part 38 and an outer part 39. The inner part 38 and the outer part 39 are preferably made of two different materials, wherein the inner part 38 is more flexible than the outer part 39. The inner part 38 is configured to be inserted into the insertion groove 20 and the outer part 39 is configured to extend into the tongue groove 21*a*, 21*b*.

Figure 9H:
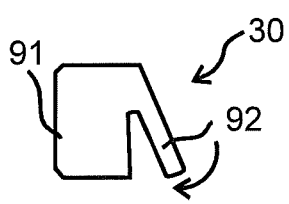
Figure 9I:
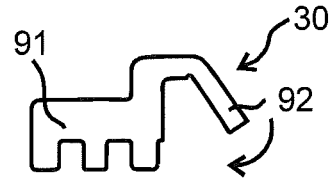
Figure 9J:
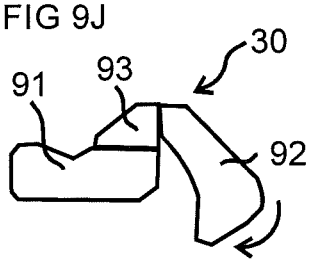

FIGS. 9G-J show in cross section embodiments of the tongue 30 comprising an inner part 91 and a pivoting outer part 92. The inner part 91 is configured to be inserted into the insertion groove 20 and the outer part 92 is configured to extend into the tongue groove 21*a*, 21*b* and pivot during assembly of the third panel 2*a* with the first panel 1*a* and/or the second panel 1*b*. The embodiments in FIGS. 9H-9I are preferably produced in one material, such as a polymer, by extruding. The embodiment in FIG. 9J is preferably produced by coextruding and comprises at least two different polymer materials. The embodiment comprises a hinge portion 93 which connects the inner part 91 and the outer part 92. The material of the hinge portion 93 is preferably more flexible than the inner part 91 and the outer part 93.

In some embodiments, at least one of the panel 1 of the first panel type, such as the first panel 1*a* and the second panel 1*b*, and the panel 2 of the second panel type, such as the second panel 2*a*, comprises a flexible tongue formed integral with and in the same material as a material of the at least one panel 1 of the first panel type and the panel 2 of the second panel type.

Furthermore, the tongue groove may be formed integral with and in the same material as the panel in which it is formed. Such flexible tongues and tongue grooves formed integral with and in the same material as the panel may e.g. be configured as the tongue, such as the split tongue, disclosed in embodiments of WO2010070605, which is incorporated herein in its entirety by reference.

As is illustrated in FIGS. 1B-1C, 7B-7C, and 8B, each insertion groove 20 may be inclined towards the respective first surface 7*a*, 7*b* of the panel 1 of the first panel type. When the insertion groove 20 in provided in the panel 1 of the first panel type, such as the first panel 1*a* and the second panel 1*b*, the respective first tongue 9*a* and second tongue 9*b* of the panel 2 of the second panel type, such as the third panel 2*a*, is arranged to push each flexible tongue 30 into the insertion groove 20 when the third panel 2*a* is joined to the panel 1 of the first panel type. The first tongue 9*a* and second tongue 9*b* may have a chamfer between their respective end surfaces and the second side surfaces 9*e*, 9*f*. This provides for easier displacing of the flexible tongue, wherein it is easier to assemble the panels.

The flexible tongue 30 may be arranged between the first surface 7*a* and the edge groove 4*a* of the panel 1 of the first panel type, such as the first panel 1*a*, and the second panel 1*b*.

In some embodiments the panel 2 of the second panel type, such as the third panel 2*a*, may comprise at least one end groove formed between the first tongue 9*a* and the second tongue 9*a*. The end groove may be formed by the first side surfaces 9*a*, 9*b*, and a bottom surface 9*g* extending therebetween, such as is illustrated in FIGS. 1C, 7C, and 8B. Hence, the end groove is at least partially formed by a lateral surface of the first tongue 9*a* and a lateral surface of the second tongue 9*b* of the panel 2 of the second panel type, and a surface extending between the lateral surfaces.

The panel 2 of the second panel type, such as the third panel 2*a*, may comprise a single end groove between the first tongue 21*a* and the second tongue 21*b* thereof. A tongue of the panel 1 of the first panel type may be formed by the end surface 4*a* and the first side wall 4*c*. Such tongues of the first panel 1*a* and second panel 1*b* may form tongue portions of a multi-part tongue. The multi-part tongue may be formed when the first panel and the second panel are arranged with their respective end surfaces 4*b* in abutment and with their respective edge grooves 4*a* arranged in parallel. The multi-part tongue may be configured to be arranged in the single end groove of the panel 2 of the second panel type, such as the third panel 2*a*.

FIGS. 11A-11D illustrate embodiments of the corner element 3, 3*b*. The corner element 3 may comprise a support element 40 configured to be supported by at least one of the panel 1 of the first panel type and the panel 2 of the second panel type. In some embodiments, such as is illustrated in FIG. 11B, the support element 40 is supported by the panel 1 of the first panel type and the panel 2 of the second panel type, when fully seated. A first support portion 40*a* may be configured to abut the end surface 4*a* of the panel 1 of the first panel type. A second support portion 40*b* may be configured to abut the bottom surface 9*g* of the end groove of the panel 2 of the second panel type. A third support portion 40*c* may be configured to be supported by the first side wall 9*d* of the first tongue 9*a* or the second side wall 9*d* of the second tongue 9*b* of the panel 2 of the second panel type. The support element may comprise one, two or all of the first support portion 40*a*, second support portion 40*b* and the third support portion 40*c*. The support element and its respective portions may extend at least partially along the length of the corner element 3.

As can be seen in FIG. 11B, the corner element 3 may comprise a locking element 41 configured to lock against the first tongue groove 21*a* or the second tongue groove 21*b* of the panel 2 of the second panel type. The locking element 41 may extend from an inner side wall of the corner element 3. The locking element 41 may extend at least partially along the length of the corner element 3. For example, the locking element may be curved away from the support element 40.

The corner element 3 may be configured to be assembled by positioning the locking element 41 in the tongue groove 21, 21*b* of the panel of the second panel type, and then angling the corner element 3 towards the end groove of the panel of the second panel type, as is illustrated with the curved arrow in FIG. 11B, until the support element 40 is received in the end groove to be fully seated, as described above. Alternatively or additionally, the corner element 3 may be configured to be assembled by inserting the corner element 3 diagonally towards the panel of the second panel type, as is indicated with the straight arrow in FIG. 11B. The corner element is locked or held in place by the locking element 41 and the support element 40. For example, the tongue 9a, 9b may be received between the locking element 41 and the support element 40, such as snugly received therebetween.

As is illustrated in FIGS. 11A, and 11C-11D, the corner element 3 may comprise an end surface 42, such as an end plate. When a panel 1 of the first panel type is attached to a panel 2 of the second panel type to form a side surface of a frame, one of the first tongue 9a and the second tongue 9b may be visible and not covered by the panel of the first panel type, such as is illustrated in FIG. 11C. When the corner element 3 is attached to the panel 2 of the second panel type, the end surface 42 may cover any exposed part of the locking element, such as the first tongue 9a or second tongue 9b. For example, the end surface 42 may have a width/height that substantially corresponds to the thickness of the panel 1 of the first panel type and the thickness of the panel 2 of second panel type, as is illustrated in FIG. 11A. As is illustrated in FIG. 11D, the corner element 3 only has a single end surface 42 or end plate at one of its end. However, in other embodiments the corner element has an end surface 42 or end plate at each of its ends. The support element 40 and/or the locking element 41 may extend along the entire length of the corner element 3 from an inner side of the end plate to the other end of the corner element, or to the inner side surface of the end plate of at the other end of the corner element 3.

As is illustrated in FIGS. 2A-2C, 6A-6C, and 8A, the panel 1 of the first panel type, such as the first panel 1a and the second panel 2a, comprises at least one of a front edge and a back edge, which extends between the first surface 7a and the second surface 7b thereof. An adjacent end 44 of the edge groove 4a and/or the insertion groove 20 of the panel 1 of the first panel type may be spaced apart from the front edge. Hence, the locking element including the edge groove 4a and/or the insertion groove 20 is covered by the front edge. In some embodiments the edge groove 4a and/or the insertion groove 20 of the panel 1 of the first panel type is additionally or alternatively spaced apart from and a back edge, which extends between the first surface 7a and the second surface 7b thereof.

Similarly, the first tongue 9a and the second tongue 9b of the panel 2 of the second panel type may be spaced apart from at least one of a front edge and a back edge, which extends between the first surface 8a and the second surface 8b thereof. An adjacent end 44 of the first tongue 9a and the second tongue 9b of the panel 2 of the second panel type may be spaced apart from the front edge. Hence, the locking element including the first tongue 9a and the second tongue 9b is covered by the front edge. In some embodiments the first tongue 9a and the second tongue 9b of the panel 2 of the second panel type is additionally or alternatively spaced apart from and a back edge, which extends between the first surface 8a and the second surface 8b thereof. Hence, any separate component to conceal the locking element is unnecessary, wherein fewer parts are required to provide a visibly acceptable frame, which in turn simplifies production, logistics, and assembly.

Figure 3A:
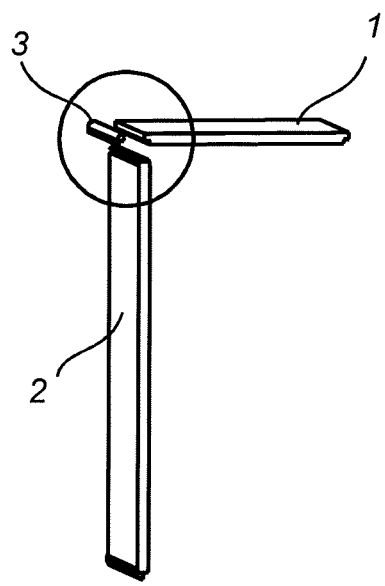
FIG. 3A is an exploded view of embodiments of a panel of a first panel type, a panel of a second panel type, and a corner element.
Figure 3B:
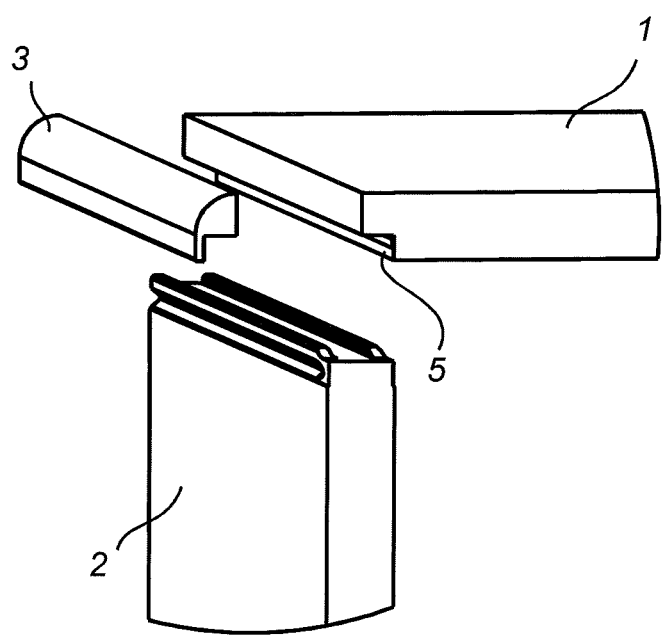
FIG. 3B is an enlarged view of the exploded view of FIG. 3A.

FIG. 5 illustrates an embodiment that comprises panels for forming at least two modules of a multi-modular frame. The set of panels includes four panels 1a-1b, 1d-1e of the first panel type, and three panels 2a-2c of the second panel type. Optionally, the set of panels may also include any number of corner elements, such as two or four. Each end of a first panel 2a of the second panel type is locked to two panels, 1a-1b, 1d-1e of the first panel type. The first panel 2a may form a centre wall or centre partitioning of the multi-modular frame. Each end of a second panel 2b and a third panel 2c of the second panel type is locked to a single panel 1a-1b, 1d-1e of the first panel type. When a corner element is provided, one corner element may be attached to each end of the second panel 2b and the third panel 2c of the second panel type, such as to the first tongue 9a and/or second tongue 9b of the respective second panel 2b and third panel 2c of the second panel type, as is illustrated in FIGS. 3A-3B. Hence, a first panel 1a and a second panel 1b of the first panel type may form a bottom section of the multi-modular frame, and a third panel 1d and a fourth panel 1e of the first panel type may form a top section of the multi-modular frame. The second panel 2b and the third panel 2c of the second panel type may form side sections of the multi-modular frame.

The multi-modular frame can be extended to any number of modules. Each additional module only requires two panels of the first panel type, and one panel of the second panel type.

Figure 10A:
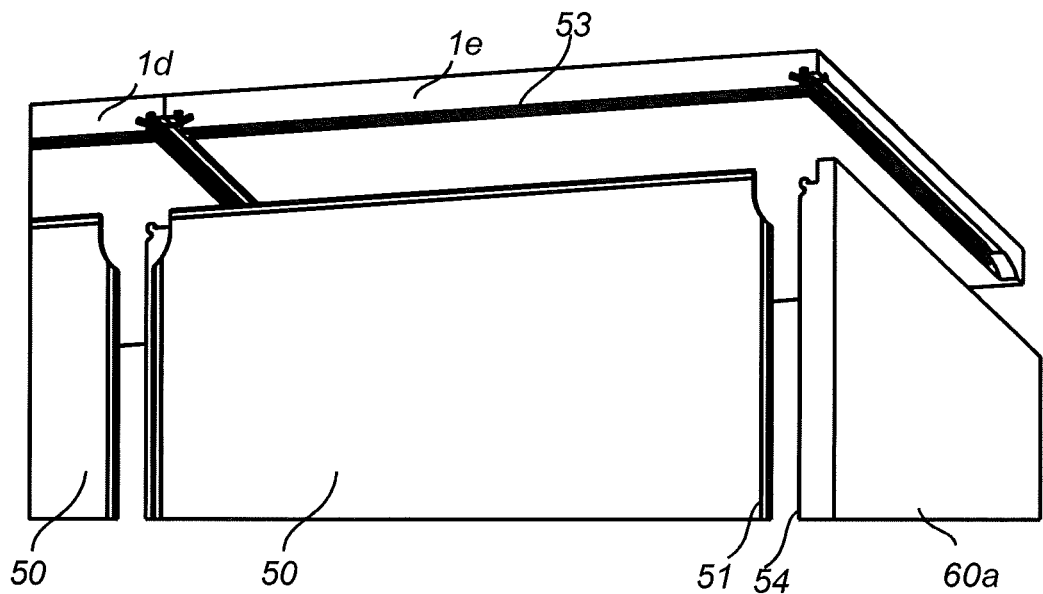
FIGS. 10A-10B are exploded views of panels of the first panel type, the second panel type, and a third panel type.
Figure 10B:
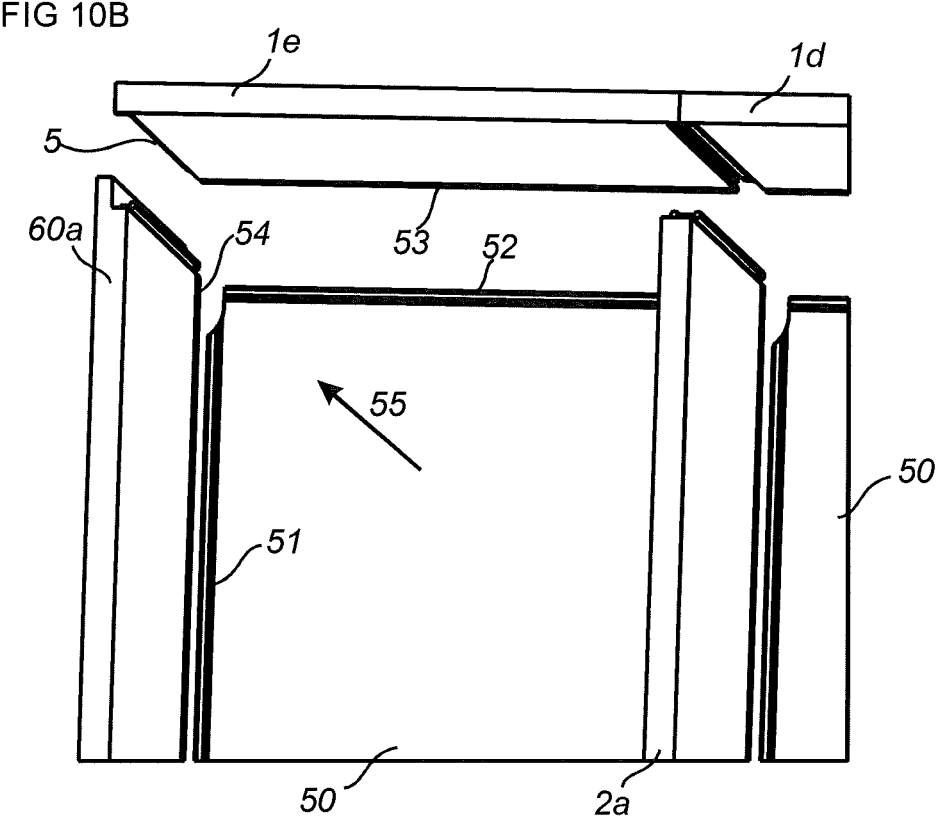

FIGS. 10A-10B illustrate a frame assembled by the panels 1 of the first panel type and the panels 2 of the second panel type and that comprises a panel or element 50 of a third panel type. The panel 50 of the third panel type may form a back of the frame. Although a multi-module frame is illustrated, the panel 50 of the third panel type may be used for a single module. A panel 2 of the second panel type is preferably connected to a panel 1 of the first panel type before the panel 50 of the third panel type is connected to the other panels. The panel of the third panel type 50 may be displaced in a diagonal direction such that a first edge 51 and a second edge 52 of the panel 50 of the third panel type is connected at the same time to an edge 53 of the panel 1 of the first panel type and to and edge 54 of the panel 2 of the second panel type. An alternative is to displace the panel 50 of the third panel type in a first direction perpendicular to the panel 1 of the first panel type and subsequently displace the panel 50 of the third panel type in a second direction perpendicular to the panel 2 of the second panel type. The first edge 51 of the panel 50 of the third panel type is in this embodiment connected displaceable at the first edge 51. Another alternative is to displace the panel 50 of the third panel type in the second direction perpendicular to the panel 2 of the second panel type and subsequently displace the panel 50 of the third panel type in the first direction perpendicular to the panel 1 of the first panel type. The second edge 52 of the panel 50 of the third panel type is in this embodiment connected displaceable at the second edge 52. Further, the connected panel 1 of the first panel type, the panel 2 of the second panel type, and another panel 1 of the first panel type can together be displaced diagonally opposite to the direction 55 such that the second edge 52 of the panel of the first panel 1 type and a second edge of the panel 2 of the second panel type are connected at the same time to the first edge 51 and the second edge 52 of the panel 50 of the third panel type. The panel 1 of the first panel type and the panel 2 of the second panel type may have edge grooves along the edges that are to form the back side of the frame, which are configured to mate with tongues of the panel of the third panel type, as is illustrated in FIGS. 10A-10B. Further detailed solutions of the edge groove at the back side and the tongue of the panel 50 of the third panel type are described in WO2015/038059, which is incorporated herein by reference in its entirety for all purposes.

The multi-module frame may be assembled by first placing two panels 1 of the first panel type with their end surfaces 4b in parallel, and optionally in abutment. One of the panels 1 of the first panel type can be placed with one side, i.e. the side opposing the side facing the other panel, against a stop surface, such as a wall. Then, a weight can be placed on the other panel. Preferably a person assembling the panels can simply stand on the other panel such that the two panels 1 of the first panel type are not separated or displaced during assembly with a first panel 2 of the second panel type. Once the panels 1 of the first panel type are positioned, panels 2 of the second panel type are connected to the positioned panels 1 of the first panel type. Preferably, one panel 2 of the second panel type is connected to join the two panels 1 of the first panel type and the panel 2 of the second panel type, as is described above. A back panel, i.e. a panel 50 of the third panel type as disclosed above, may be attached if desired, before two panels 2 of the second panel type are attached, one to each of the panels 1 of the first panel type. Finally, two panels 1 of the first panel type are attached at the top of the panels of the second panel type in order to form the top section of the multi-modular frame.

FIGS. 6A-6D illustrate embodiments of a frame, such as a multi-module frame, that is composed of three types of panels, and may optionally also comprise the third panel type as discussed above. Panels 60, 60a, 60b of a fourth panel type may be used as side elements of a frame. The panels 60, 60a, 60b of the fourth panel type may be used rather than panels 2 of the second panel type as side panels of the frame in order to avoid corner elements. The panel 60, 60a, 60b of the fourth panel type is configured to be joined to a single panel 1 of the first panel type at each end thereof. Hence, at each end of the panel 60, 60a, 60b of the fourth panel type only one of the tongues 9a, 9b described in embodiments above is provided. If the configuration of the panel 60, 60a, 60b of the fourth panel type is symmetric along the edge where the locking element is provided, the panel can be rotated such that a single panel may fit as a side section at either side of the frame. Furthermore, a corner portion 61 may be formed integral and in the same material as the panel 60, 60a, 60b. An end of the corner portion 61 may be configured to be substantially flush with the second side surface 7b of the panel 1 of the first panel type, as is illustrated in FIG. 7B. At the front edge of the panel 60 of the fourth panel type the tongue 9a, 9b may be spaced apart from the front edge, as has been described above, such that the tongue 9a, 9b is not visible from the front of the frame. In case the panel 60 of the fourth panel type is to be combined with a panel 50 of the third panel type, a separate panel for the left and right sides of the frame may be provided, such that the groove for the panel 50 of the third panel type is located towards the back of the frame.

Figure 12A:
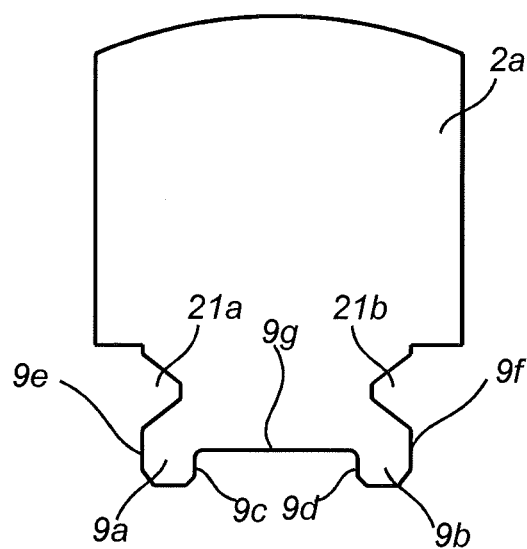
FIG. 12A is an enlarged side view of an end surface of the second panel type.

FIG. 12A shows is an enlarged side view an embodiment of the end surface 9 of the second panel type 2a. The embodiment comprises tongues 9a, 9b which are displaced from the first surface 8a and a second surface 8b of the second panel 2a.

Figure 12B:
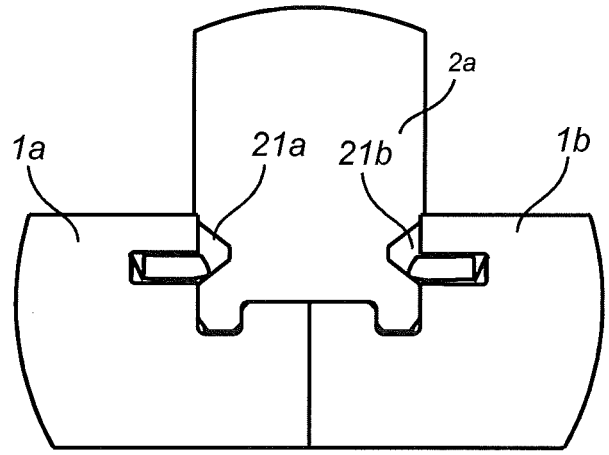
FIG. 12B is an enlarged side view of the back side of an alternative to the embodiment of the assembled product of FIG. 1A.

FIG. 12B illustrates an embodiment wherein the locking element with the flexible tongues 30 are positioned in insertion grooves 20 which extends essentially perpendicular to the first surface 8a and a second surface 8b, respectively of the second panel 2a. The function of the locking element of FIG. 12B corresponds to the function of the locking element discussed above as well as below.

Figure 12C:
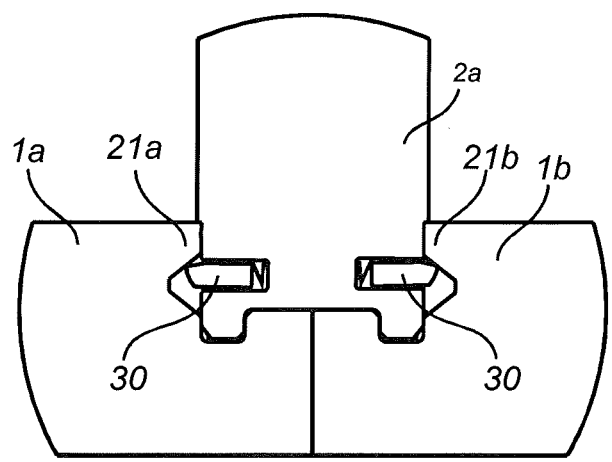
FIG. 12C is an enlarged side view of the back side of an alternative to the embodiment of the assembled product of FIG. 1A.

FIG. 12C illustrates an embodiment wherein the locking element with the flexible tongues 30 are positioned in insertion grooves 20 in the panel 2 of the second panel type. The tongue groove 21a, 21b is arranged in the panel 1 of the first panel type. The insertion grooves 20 extends essentially perpendicular to the first surface 8a and a second surface 8b, respectively of the second panel 2a. The function of the locking element of FIG. 12C corresponds to the function of the locking element discussed above.

It should also be appreciated that features disclosed in the foregoing description, and/or in the foregoing drawings and/or following claims both separately and in any combination thereof, are material for realizing the present disclosure in diverse forms thereof. When used in the following claims, the terms "comprise", "include", "have" and their conjugates mean, "including but not limited to".

The present above disclosure has been described several specific embodiments. However, other embodiments than the above described are equally possible within the scope of the disclosure. Different method steps than those described above may be provided within the scope of the disclosure. The different features and steps may be combined in other combinations than those described. The scope of the invention is only limited by the appended patent claims.

EMBODIMENTS

1. A set of panels for an assembled product, comprising:
a first panel (1a);
a second panel (1b); and
a third panel (2a); wherein
each of the first panel (1a) and the second panel (1b) comprises a first surface (7a), a second surface (7b), which is substantially parallel with the first surface (7a), an edge groove (4a), and an end surface (4b);
the third panel (2a) comprises a first surface (8a) and a second surface (8b), which is substantially parallel with the first surface (8a), and an end surface extending at least partially between the first surface (8a) and the second surface (8b) of the third panel (2a); and
the end surface of the third panel (2a) comprises a first tongue (9a) and a second tongue (9b);
characterized in that
the first panel (1a) and the second panel (1b) are configured to be arranged with their respective end surfaces (4b) facing each other, and with their respective edge grooves (4a) in parallel; and
the first tongue (9a) of the third panel (2a) is configured to be arranged in the edge groove (4a) of the first panel (1a) to join the first panel (1a) and the third panel (2a), and the second tongue (9b) of the third panel (2a) is configured to be received in the edge groove (4a) of the second panel (2b) to join the second panel (1b) to the third panel (2a), whereby the first panel (1a), the second panel (1b), and the third panel (2a) are joined at least in a first direction.

2. The set of panels according to embodiment 1, wherein the first panel (1a) and the second panel (1b) are configured to be arranged with their respective end surfaces (4b) in abutment.

3. The set of panels according to embodiment 1 or 2, wherein each of the first panel (1a) and the second panel (1b) further comprises an insertion groove (20) for a flexible tongue (30), the insertion groove (20) being arranged between the end surface (4b) and the first surface (7a) of the respective first panel (1a) and the second panel (1b), and wherein the third panel (2a) comprises a first tongue groove (21a) extending from the first surface (8a) thereof and a second tongue groove (21b) extending from the second surface (8b) thereof, wherein each tongue groove (21a, 21b) is arranged to receive a portion of the flexible tongue (30) when the first panel (1a), the second panel (1b), and the third panel (2a) are joined.

4. The set of panels according to embodiment 1 or 2, wherein at least one of the first panel and the second panel comprises a flexible tongue formed integral with and in the same material as a material of said at least one of the first panel and the second panel.

5. The set of panels according to embodiment 3, wherein each insertion groove (20) is inclined towards the respective first surface (7a) of the first panel (1a) and the second panel (1b), and wherein the respective first tongue (9a) and second tongue (9b) of the third panel (2a) are arranged to push each flexible tongue (30) into the insertion groove (20) when the third panel (2a) is joined to the first panel (1a) and the second panel (1b).

6. The set of panels according to any of the previous embodiments, wherein each of the first panel (1a) and the second panel (1b) comprises a tongue formed by the end surface (4b) and the edge groove (4a) thereof, and wherein the third panel (2a) comprises at least one end groove between the first tongue (9a) and the second tongue (9b) thereof.

7. The set of panels according to embodiment 6, wherein the end groove is at least partially formed by a lateral surface (9c) of the first tongue (9a) of the third panel (2a) and a lateral surface (9d) of the second tongue (9b) of the third panel (2a), and a surface (9g) extending between said lateral surfaces (9c, 9d).

8. The set of panels according to embodiment 6 or 7, wherein the third panel (2a) comprises a single end groove between the first tongue (9a) and the second tongue (9b) of the third panel (2a), and wherein the tongue of the first panel (1a) and the tongue of the second panel (1b) are tongue portions of a multi-part tongue, said multi-part tongue being formed when the first panel (1a) and the second panel (1b) are arranged with their respective end surfaces (4a) in abutment and with their respective edge grooves (4a) arranged in parallel, and said multi-part tongue being configured to be arranged in said single end groove of the third panel (2a).

9. The set of panels according to any of embodiments 6-8, wherein
an end surface of the tongue of the first panel (1a) and an end surface of the tongue of the second panel (1b) are configured to abut the end groove of the third panel (2a), and an end surface of the first tongue (9a) of the third panel (2a) is configured to be spaced apart from a bottom wall of the edge groove (4a) of the first panel (1a) and an end surface of the second tongue (9b) of the third panel (2a) is configured to be spaced apart from a bottom wall of the edge groove (4a) of the second panel (1b), when the panels are assembled; or
an end surface of the tongue of the first panel (1a) and an end surface of the tongue of the second panel (1b) are configured to be spaced apart from the end groove of the third panel (2a), and an end surface of the first tongue (9a) of the third panel (2a) is configured to abut a bottom wall of the edge groove (4a) of the first panel (1a) and an end surface of the second tongue of the third panel (2a) is configured to abut a bottom wall of the edge groove (4a) of the second panel (1b), when the panels are assembled.

10. The set of panels according to any of the previous embodiments, wherein each of the first panel (1a) and the second panel (1b) comprises at least one of a front edge and a back edge, which extends between the first surface (7a) and the second surface (7b) of the respective first panel (1a) and the second panel (1b), and wherein one adjacent end of the edge groove (4a) of the respective first panel (1a) and the second panel (1b) is spaced apart from said at least one of a front edge and a back edge.

11. A set of panels for forming a multi-module frame, wherein the set of panels comprises:
a plurality of panels (1) of a first panel type configured to be arranged in a first direction;
a plurality of panels (2) of a second panel type configured to be arranged in a second direction, which is substantially perpendicular to the first direction; and
at least one corner element (3); wherein the panels (1) of the first panel type comprise locking elements (4) extending along edge portions of opposite ends of each panel (1);
the panels of the second panel (2) type comprise a first locking element (6a) and a second locking element (6b) arranged at the same end of the panel (2) of the second panel type,
the first locking element (6a) and the second locking element (6b) of the panels (2) of the second panel type being directly lockable to either of the locking elements (4) of the panels (1) of the first panel type, and
the corner element (3) is attachable to at least one of the first locking element (6a) and the second locking element (6b) at one end of the panel (2) of the second panel type when said panel (2) of the second panel type is directly locked to a single panel (1) of the first panel type.

12. The set of panels according to embodiment 11, wherein the corner element (3) comprises at least one of a support element (40) configured to be supported by at least one of the panel (1) of the first panel type and the panel (2) of the second panel type, and a locking element (41) locking against a tongue groove (21a, 21b) of the panel (2) of the second panel type.

13. The set of panels according to any of embodiments 11-12, wherein the set comprises panels for forming at least two modules of a multi-modular frame, including:
four panels (1) of the first panel type;
three panels (2) of the second panel type of; and
at least one corner element (3), wherein
each end of a first panel (2a) of the second panel type is lockable to two panels (1a, 1b) of the first panel type, and each end of a second panel (2b) and a third panel (2c) of the second panel type is lockable to a single panel (1a, 1b) of the first panel type; and one corner element (3a, 3b, 3c, 3d) is attached to at least one of the end of the second panel and the third panel of the second panel type.

14. The set of panels according to any of embodiments 1-13, wherein
a first panel (1a) is of the first panel type;
a second panel (1b) is of the first panel type; and
a third panel (2a) is of the second panel type; wherein
each of the first panel (1a) and the second panel (1b) comprises a first surface (7a), a second surface (7b), which is substantially parallel with the first surface (7a), an edge groove (4a), and an end surface (4b);
the third panel (2a) comprises a first surface (8a) and a second surface (8b), which is substantially parallel with the first surface (8a), and an end surface extending at least partially between the first surface (8a) and the second surface (8b) of the third panel (2a); the end surface of the third panel (2a) comprises a first tongue (9a) and a second tongue (9b);

the first panel (1a) and the second panel (2a) are configured to be arranged with their respective end surfaces (4b) facing each other, and with their respective edge grooves (4a) in parallel; and the first tongue (9a) of the third panel (2a) is configured to be arranged in the edge groove (4a) of the first panel (1a) to join the first panel (1a) and the third panel (2a), and the second tongue (9b) of the third panel (2a) is configured to be received in the edge groove (4a) of the second panel (1b) to join the second panel (1b) to the third panel (2a), whereby the first panel (1a), the second panel (1b), and the third panel (2a) are joined at least in a first direction.

15. The set of panels according to embodiment 14, wherein the first panel (1a) and the second panel (1b) are configured to be arranged with their respective end surfaces (4b) in abutment.

16. The set of panels according to embodiment 14 or 15, wherein each of the first panel (1a) and the second panel (1b) further comprises an insertion groove (20) for a flexible tongue 30), the insertion groove (20) being arranged between the end surface (4b) and the first surface (7a) of the respective first panel (1a) and the second panel (1b), and wherein the third panel (2a) comprises a first tongue groove (21a) extending from the first surface (8a) thereof and a second tongue groove (21b) extending from the second surface (8b) thereof, wherein each tongue groove (21a, 21b) is arranged to receive a portion of the flexible tongue (30) when the first panel (1a), the second panel (1b), and the third panel (2a) are joined.

17. The set of panels according to embodiment 14 or 15, wherein at least one of the first panel and the second panel comprises a flexible tongue formed integral with and in the same material as a material of said at least one of the first panel and the second panel.

18. The set of panels according to embodiment 16, wherein each insertion groove (20) is inclined towards the respective first surface (7a) of the first panel (1a) and the second panel (1b), and wherein the respective first tongue (9a) and second tongue (9b) of the third panel (2a) are arranged to push each flexible tongue (30) into the insertion groove (20) when the third panel (2a) is joined to the first panel (1a) and the second panel (1b).

19. The set of panels according to any of embodiments 14-18, wherein each of the first panel (1a) and the second panel (1b) comprises a tongue formed by the end surface (4b) and the edge groove (4a) thereof, and wherein the third panel (2a) comprises at least one end groove between the first tongue (9a) and the second tongue (9b) thereof.

20. The set of panels according to embodiment 19, wherein the end groove is at least partially formed by a lateral surface (9c) of the first tongue (9a) of the third panel (2a) and a lateral surface (9d) of the second tongue (9b) of the third panel (2a), and a surface extending between said lateral surfaces (9c, 9d). 21. The set of panels according to embodiment 18 or 19, wherein the third panel (2a) comprises a single end groove between the first tongue (9a) and the second tongue (9b) of the third panel (2a), and wherein the tongue of the first panel (1a) and the tongue of the second panel (1b) are tongue portions of a multi-part tongue, said multi-part tongue being formed when the first panel (1a) and the second panel (1b) are arranged with their respective end surfaces (4b) in abutment and with their respective edge grooves (4a) arranged in parallel, and said multi-part tongue being configured to be arranged in said single end groove of the third panel (2a).

22. The set of panels according to any of embodiments 18-21, wherein
an end surface of the tongue of the first panel (1a) and an end surface of the tongue of the second panel (1b) are configured to abut the end groove of the third panel (2a), and an end surface of the first tongue (9a) of the third panel (2a) is configured to be spaced apart from a bottom wall of the edge groove (4a) of the first panel and an end surface of the second tongue (9b) of the third panel (2a) is configured to be spaced apart from a bottom wall of the edge groove (4a) of the second panel (1b), when the panels are assembled; or
an end surface of the tongue of the first panel (1a) and an end surface of the tongue of the second panel (1b) are configured to be spaced apart from the end groove of the third panel (2a), and an end surface of the first tongue (9a) of the third panel (2a) is configured to abut a bottom wall of the edge groove (4a) of the first panel (1a) and an end surface of the second tongue (9b) of the third panel (2a) is configured to abut a bottom wall of the edge groove (4a) of the second panel (1b), when the panels are assembled.

23. The set of panels according to any of embodiments 18-22, wherein each of the first panel (1a) and the second panel (1b) comprises at least one of a front edge and a back edge, which extends between the first surface (7a) and the second surface (7b) of the respective first panel (1a) and the second panel (1b), and wherein one adjacent end of the edge groove (4a) of the respective first panel (1a) and the second panel (1b) is spaced apart from said at least one of a front edge and a back edge.

The invention claimed is:

1. A set of panels for an assembled product, comprising:
a first panel;
a second panel; and
a third panel; wherein
each of the first panel and the second panel comprises a first surface, a second surface, which is substantially parallel with the first surface, an edge groove, and an end surface;
the third panel comprises a first surface and a second surface, which is substantially parallel with the first surface, and an end surface extending at least partially between the first surface and the second surface of the third panel; and
the end surface of the third panel comprises a first tongue and a second tongue extending from the end surface of the third panel in a vertical direction away from the end surface of the third panel;
wherein:
the first panel and the second panel are configured to be arranged with their respective end surfaces facing each other, and with their respective edge grooves in parallel, their respective edge grooves facing vertically upwardly; and
by vertical displacement of the third panel toward the first and second panels, the first tongue of the third panel is configured to be arranged in the edge groove of the first panel to join the first panel and the third panel, and the second tongue of the third panel is configured to be received in the edge groove of the second panel to join the second panel to the third panel, whereby the first panel, the second panel, and the third panel are joined at least in a first direction.

2. The set of panels according to claim 1, wherein the first panel and the second panel are configured to be arranged with their respective end surfaces in abutment.

3. The set of panels according to claim 1, wherein each of the first panel and the second panel further comprises an insertion groove for a flexible tongue, the insertion groove being arranged between the end surface and the first surface of the respective first panel and the second panel, and wherein the third panel comprises a first tongue groove extending from the first surface thereof and a second tongue groove extending from the second surface thereof, wherein each tongue groove is arranged to receive a portion of the flexible tongue when the first panel, the second panel, and the third panel are joined.

4. The set of panels according to claim 3, wherein each insertion groove is inclined towards the respective first surface of the first panel and the second panel, and wherein the respective first tongue and second tongue of the third panel are arranged to push each flexible tongue into the insertion groove when the third panel is joined to the first panel and the second panel.

5. The set of panels according to claim 1, wherein at least one of the first panel and the second panel comprises a flexible tongue formed integral with and in the same material as a material of said at least one of the first panel and the second panel.

6. The set of panels according to claim 1, wherein each of the first panel and the second panel comprises a tongue formed by the end surface and the edge groove thereof, and wherein the third panel comprises at least one end groove between the first tongue and the second tongue thereof.

7. The set of panels according to claim 6, wherein the end groove is at least partially formed by a lateral surface of the first tongue of the third panel and a lateral surface of the second tongue of the third panel, and a surface extending between said lateral surfaces.

8. The set of panels according to claim 6, wherein the third panel comprises a single end groove between the first tongue and the second tongue of the third panel, and wherein the tongue of the first panel and the tongue of the second panel are tongue portions of a multi-part tongue, said multi-part tongue being formed when the first panel and the second panel are arranged with their respective end surfaces in abutment and with their respective edge grooves arranged in parallel, and said multi-part tongue being configured to be arranged in said single end groove of the third panel.

9. The set of panels according to claim 6 wherein:
an end surface of the tongue of the first panel and an end surface of the tongue of the second panel are configured to abut the end groove of the third panel, and an end surface of the first tongue of the third panel is configured to be spaced apart from a bottom wall of the edge groove of the first panel and an end surface of the second tongue of the third panel is configured to be spaced apart from a bottom wall of the edge groove of the second panel, when the panels are assembled; or
an end surface of the tongue of the first panel and an end surface of the tongue of the second panel are configured to be spaced apart from the end groove of the third panel, and an end surface of the first tongue of the third panel is configured to abut a bottom wall of the edge groove of the first panel and an end surface of the second tongue of the third panel is configured to abut a bottom wall of the edge groove of the second panel, when the panels are assembled.

10. The set of panels according to claim 1, wherein each of the first panel and the second panel comprises at least one of a front edge and a back edge, which extends between the first surface and the second surface of the respective first panel and the second panel, and wherein one adjacent end of the edge groove of the respective first panel and the second panel is spaced apart from said at least one of a front edge and a back edge.

11. A set of panels for forming a multi-module frame, wherein the set of panels comprises:
a plurality of panels of a first panel type configured to be arranged in a first direction;
a plurality of panels of a second panel type configured to be arranged in a second direction, which is substantially perpendicular to the first direction; and
at least one corner element;
wherein:
the panels of the first panel type comprise locking elements extending along edge portions of opposite ends of each panel;
the panels of the second panel type comprise a first locking element and a second locking element arranged at the same end of the panel of the second panel type, wherein for each panel of the second panel type, the first locking element and the second locking element extend from the same end of the panel in a locking element direction away from the same end, and the first locking element of the panel is spaced from the second locking element of the panel along a direction of a shortest thickness of the panel;
the first locking element and the second locking element of the panels of the second panel type being directly lockable to either of the locking elements of the panels of the first panel type by displacement of the first locking element and the second locking element of the panels of the second panel type relative to the either of the locking elements of the panels of the first panel type along the locking element direction; and
by displacement of the corner element in the locking element direction, the corner element is attachable to at least one of the first locking element and the second locking element at one end of the panel of the second panel type when said panel of the second panel type is directly locked to a single panel of the first panel type.

12. The set of panels according to claim 11, wherein the corner element comprises at least one of a support element configured to be supported by at least one of the panel of the first panel type and the panel of the second panel type, and a locking element locking against a tongue groove of the panel of the second panel type.

13. The set of panels according to claim 11, wherein the set comprises panels for forming at least two modules of a multi-modular frame, including:
four panels of the first panel type;
three panels of the second panel type; and
at least one corner element, wherein
each end of a first panel of the second panel type is lockable to two panels of the first panel type, and each end of a second panel and a third panel of the second panel type is lockable to a single panel of the first panel type;
and one corner element is attached to at least one of the ends of the second panel and the third panel of the second panel type.

14. The set of panels according to claim 11, wherein a first panel is of the first panel type;
a second panel is of the first panel type; and
a third panel is of the second panel type;
wherein:
each of the first panel and the second panel comprises a first surface, a second surface, which is substantially parallel with the first surface, an edge groove, and an end surface;
the third panel comprises a first surface and a second surface, which is substantially parallel with the first surface, and an end surface extending at least partially between the first surface and the second surface of the third panel;

the end surface of the third panel comprises a first tongue and a second tongue;

the first panel and the second panel are configured to be arranged with their respective end surfaces facing each other, and with their respective edge grooves in parallel; and the first tongue of the third panel is configured to be arranged in the edge groove of the first panel to join the first panel and the third panel, and the second tongue of the third panel is configured to be received in the edge groove of the second panel to join the second panel to the third panel, whereby the first panel, the second panel, and the third panel are joined at least in a first direction.

15. The set of panels according to claim 14, wherein the first panel and the second panel are configured to be arranged with their respective end surfaces in abutment.

16. The set of panels according to claim 14, wherein each of the first panel and the second panel further comprises an insertion groove for a flexible tongue, the insertion groove being arranged between the end surface and the first surface of the respective first panel and the second panel, and wherein the third panel comprises a first tongue groove extending from the first surface thereof and a second tongue groove extending from the second surface thereof, wherein each tongue groove is arranged to receive a portion of the flexible tongue when the first panel, the second panel, and the third panel are joined.

17. The set of panels according to claim 16, wherein each insertion groove is inclined towards the respective first surface of the first panel and the second panel, and wherein the respective first tongue and second tongue of the third panel are arranged to push each flexible tongue into the insertion groove when the third panel is joined to the first panel and the second panel.

18. The set of panels according to claim 17, wherein the third panel comprises a single end groove between the first tongue and the second tongue of the third panel, and wherein the tongue of the first panel and the tongue of the second panel are tongue portions of a multi-part tongue, said multi-part tongue being formed when the first panel and the second panel are arranged with their respective end surfaces in abutment and with their respective edge grooves arranged in parallel, and said multi-part tongue being configured to be arranged in said single end groove of the third panel.

19. The set of panels according to claim 17, wherein:

an end surface of the tongue of the first panel and an end surface of the tongue of the second panel are configured to abut the end groove of the third panel, and an end surface of the first tongue of the third panel is configured to be spaced apart from a bottom wall of the edge groove of the first panel and an end surface of the second tongue of the third panel is configured to be spaced apart from a bottom wall of the edge groove of the second panel, when the panels are assembled; or an end surface of the tongue of the first panel and an end surface of the tongue of the second panel are configured to be spaced apart from the end groove of the third panel, and an end surface of the first tongue of the third panel is configured to abut a bottom wall of the edge groove of the first panel and an end surface of the second tongue of the third panel is configured to abut a bottom wall of the edge groove of the second panel, when the panels are assembled.

20. The set of panels according to claim 17, wherein each of the first panel and the second panel comprises at least one of a front edge and a back edge, which extends between the first surface and the second surface of the respective first panel and the second panel, and wherein one adjacent end of the edge groove of the respective first panel and the second panel is spaced apart from said at least one of a front edge and a back edge.

21. The set of panels according to claim 14, wherein at least one of the first panel and the second panel comprises a flexible tongue formed integral with and in the same material as a material of said at least one of the first panel and the second panel.

22. The set of panels according to claim 14, wherein each of the first panel and the second panel comprises a tongue formed by the end surface and the edge groove thereof, and wherein the third panel comprises at least one end groove between the first tongue and the second tongue thereof.

23. The set of panels according to claim 22, wherein the end groove is at least partially formed by a lateral surface of the first tongue of the third panel and a lateral surface of the second tongue of the third panel, and a surface extending between said lateral surfaces.

* * * * *

UNITED STATES PATENT AND TRADEMARK OFFICE
CERTIFICATE OF CORRECTION

| | | |
|---|---|---|
| PATENT NO. | : 11,614,114 B2 | Page 1 of 1 |
| APPLICATION NO. | : 15/956949 | |
| DATED | : March 28, 2023 | |
| INVENTOR(S) | : Derelöv | |

It is certified that error appears in the above-identified patent and that said Letters Patent is hereby corrected as shown below:

On the Title Page

Please Add:
-- Prior Publication Data (65):
SE 17504606 April 20, 2017 --

Signed and Sealed this
Twelfth Day of September, 2023

*Katherine Kelly Vidal*

Katherine Kelly Vidal
*Director of the United States Patent and Trademark Office*